US007642896B2

(12) United States Patent
Kobayashi

(10) Patent No.: US 7,642,896 B2
(45) Date of Patent: Jan. 5, 2010

(54) LOCKING SYSTEM, GAME MACHINE, AND DEVICE MANAGEMENT SYSTEM

(75) Inventor: Hitoshi Kobayashi, Nagoya (JP)

(73) Assignee: Toyomaru Sangyo Kabushiki Kaisha, Nagoya-shi (JP)

( * ) Notice: Subject to any disclaimer, the term of this patent is extended or adjusted under 35 U.S.C. 154(b) by 612 days.

(21) Appl. No.: 10/517,337

(22) PCT Filed: Aug. 22, 2003

(86) PCT No.: PCT/JP03/10678

§ 371 (c)(1),
(2), (4) Date: Jan. 25, 2005

(87) PCT Pub. No.: WO2004/018806

PCT Pub. Date: Mar. 4, 2004

(65) Prior Publication Data

US 2006/0103502 A1 May 18, 2006

(30) Foreign Application Priority Data

Aug. 26, 2002 (JP) ............................ 2002-246004

(51) Int. Cl.
*G06K 19/00* (2006.01)

(52) U.S. Cl. ...................... 340/5.6; 340/5.61; 340/5.64; 340/5.63; 340/5.65; 340/5.73; 340/5.8; 340/5.81; 340/5.9

(58) Field of Classification Search ................ 340/5.61, 340/5.6, 10.1, 5.64, 5.73, 5.63, 5.65, 5.8, 340/5.81, 5.9
See application file for complete search history.

(56) References Cited

U.S. PATENT DOCUMENTS 4,072,930 A 2/1978 Lucero et al.
5,349,345 A * 9/1994 Vanderschel .............. 340/5.25

(Continued)

FOREIGN PATENT DOCUMENTS

EP 0 874 335 A1 10/1998

(Continued)

*Primary Examiner*—Vernal U Brown
(74) *Attorney, Agent, or Firm*—Oliff & Berridge, PLC

(57) ABSTRACT

An IC tag for monitoring opening/closing operation 86 is attached on the backside of the glass frame 111 at its upper right portion, and on a main body frame 110 opposing to the glass frame 111, an antenna for monitoring 68 is attached. An IC tag for monitoring opening/closing operation 186 is attached on the inside of the right frame of the wooden frame 112, and on the main body frame 111 opposing to the wooden frame 112, an antenna for monitoring 168 is attached. The distance between these antenna and IC tags is respectively set to about 3 mm in a state where the frames on which they are provided are closed. A R/W unit always polls the IC tags via the antennas. When the glass frame 111 or the main body frame 110 is opened and the distance between the antenna and the IC tag exceeds about 5 mm, the communication becomes unavailable and this state is immediately detected. An antenna for key 128 is buried above a keyhole 120. When a key incorporating an IC tag for key therein is inserted in the keyhole 120, the R/W unit reads the ID code of the IC tag. A solenoid for locking operation is turned on only when the read ID code is identical to the registered ID so as to pull a plunger for unlocking the frame.

10 Claims, 20 Drawing Sheets

U.S. PATENT DOCUMENTS

| | | | | |
|---|---|---|---|---|
| 5,392,049 | A | 2/1995 | Gunnarsson | |
| 5,434,755 | A | 7/1995 | Corathers et al. | |
| 5,434,775 | A | 7/1995 | Sims et al. | |
| 5,469,727 | A * | 11/1995 | Spahn et al. | 70/278.3 |
| 5,629,981 | A | 5/1997 | Nerlikar | |
| 5,659,291 | A * | 8/1997 | Kennedy et al. | 340/457 |
| 5,815,557 | A | 9/1998 | Larson | |
| 6,249,227 | B1 | 6/2001 | Brady et al. | |
| 6,325,294 | B2 | 12/2001 | Tuttle et al. | |
| 6,339,385 | B1 | 1/2002 | Tuttle | |
| 6,353,776 | B1 * | 3/2002 | Rohrl et al. | 701/1 |
| 6,400,255 | B1 * | 6/2002 | Ohnishi et al. | 340/5.62 |
| 6,609,969 | B1 * | 8/2003 | Luciano et al. | 463/16 |
| 6,681,987 | B1 * | 1/2004 | Ford | 235/380 |
| 6,718,235 | B1 * | 4/2004 | Borugian | 701/1 |
| 6,794,988 | B1 * | 9/2004 | Weiss et al. | 340/553 |
| 7,052,391 | B1 | 5/2006 | Luciano, Jr. | |
| 7,112,132 | B2 | 9/2006 | Yamagishi | |
| 2002/0055380 | A1 | 5/2002 | Luciano et al. | |

FOREIGN PATENT DOCUMENTS

| | | |
|---|---|---|
| JP | A 64-56249 | 3/1989 |
| JP | A 9-720 | 1/1997 |
| JP | A-09-034365 | 2/1997 |
| JP | A 10-99512 | 4/1998 |
| JP | A-10-155370 | 6/1998 |
| JP | A 10-169272 | 6/1998 |
| JP | A-10-216324 | 8/1998 |
| JP | A 10-289388 | 10/1998 |
| JP | A-10-328392 | 12/1998 |
| JP | A-2000-149079 | 5/2000 |
| JP | A-2000-288218 | 10/2000 |
| JP | A-2002-175355 | 6/2002 |
| WO | WO 99/05658 | 2/1999 |

* cited by examiner

FIG. 20

DATE:

(hh:mm:ss)

| ID CODE | MACHINE NUMBER | KIND | KEY INSERTION TIME | KEY WITHDRAWAL TIME | PERIOD OF TIME DURING WHICH THE KEY IS IN INSERTED STATE | TIME OF DISAPPEARANCE | TIME OF RECOVERY | TIME PERIOD WHERE IDENTIFICATION HAS BEEN IMPOSSIBLE | TIME AT WHICH ID ERROR HAS OCCURRED |
|---|---|---|---|---|---|---|---|---|---|
| 0583208098 | NO. 0002 | MAIN BODY FRAME | | | | 02:38:56 | 03:14:28 | 00:35:32 | |
| 0583208098 | NO. 0002 | MAIN BODY FRAME | | | | 03:52:39 | 04:01:00 | 00:08:21 | |
| 0296738591 | NO. 0134 | GLASS FRAME | | | | 13:58:00 | 14:25:46 | 00:27:46 | |
| 1368207964 | NO. 0063 | GLASS FRAME | | | | | | | 01:32:13 |
| 9265380711 | NO. 0002 | KEY | 02:37:45 | 03:14:05 | 00:35:20 | | | | |
| ....... | ....... | ....... | | | | ....... | ....... | ....... | ....... |

LOCKING SYSTEM, GAME MACHINE, AND DEVICE MANAGEMENT SYSTEM

TECHNICAL FIELD

The present invention relates to a locking system for monitoring a state of a device such as a game machine, for example, a pachinko game machine, and for locking and unlocking the device based on the result of the monitoring, a game machine, and a device management system.

BACKGROUND ART

Conventionally, among game machines, pachinko game machines are endlessly subjected to deceit actions in which prize balls are unfairly obtained, and various preventive measures have been taken. For example, if an abnormality has occurred in a pachinko game machine, the game player alerts the abnormality to a staff in the amusement center by pressing a call button and the like. The staff, who has been alerted to the abnormality, unlocks the pachinko game machine by a key and takes any measures to the abnormality. A pachinko game machine includes a wooden frame fixed to a game machine placement island, a main body frame for holding a game board, and a glass frame for holding a glass plate that protects a surface of the game board. The main body frame is opened and closed from the wooden frame, and the glass frame is opened and closed from the main body frame. In this type of known pachinko game machine, the main body frame and the glass frame are opened and closed by one and the same key. There are cases where, among game players, people who are named as Goto-shi unfairly acquire said key and make deceit actions, such as opening the glass frame using the key while staffs do not see them and putting game balls into various win holes on the board surface of the game board so as to acquire a large number of game balls, or opening the main body frame and replacing the ROM into an unauthorized one, or the like.

In order to prevent such deceit actions by an unfair use of the key, preventive measures have been taken such as providing an electric lock to a pachinko game machine, fixing a ROM by a wire to avoid the ROM from being replaced into an unauthorized one even when the main body frame is opened, or the like. In addition, visual monitoring is performed using a monitoring monitor provided in the amusement center. Further, it is also controlled when the key has been taken out of the key storage box and when it has been returned thereto.

However, in the monitoring using the monitoring monitor, whether or not deceit actions have been made is determined by human beings by checking images on the monitor. Therefore, there is high possibility that the deceit actions are overlooked. If frames of a plurality of pachinko game machines have been opened, the possibility of overlooking the opened state further increases. Checking the recorded images on the monitor takes much time. Even if the key is controlled, it is impossible to know who has used the key for which pachinko game machine, and it is difficult to trace or prevent deceit actions.

DISCLOSURE OF THE INVENTION

The present invention has been made to solve the problems described above, and an objective thereof is to provide a locking system for monitoring a state of the device such as opening and closing states in real time and for locking or unlocking the device based on the result of monitoring, a game machine, and a device management system.

A locking system according to the first invention of the present application comprises an IC tag for locking operation, an IC tag monitoring device that makes communication with the IC tag for locking operation, and a locking device that locks and unlocks a device based on a result of monitoring made by the IC tag monitoring device, wherein said IC tag for locking operation stores identification data that is used for distinguishing the IC tag from other IC tags, wherein said IC tag monitoring device includes first transmission means for transmitting a calling wave for calling said IC tag for locking operation, first reception means for receiving a reflected wave returned from said IC tag for locking operation, an antenna for key that is connected to said first transmission means and said first reception means, key determination means for determining as being normal if said first reception means receives a reflected wave containing identification data identical to registered data that is registered beforehand within a specified period of time since said first transmission means transmits a calling wave, and first output means for outputting the result of key determination made by the key determination means to the outside, and wherein said locking device comprises a key including said IC tag for locking operation and a lock that includes said antenna for key and into which said key is to be inserted.

In thus-structured locking system, the first transmission means provided to the IC tag monitoring system transmits a calling wave to the IC tag for locking operation incorporated in the key so as to call the IC tag via the antenna for key provided to a lock into which the key is to be inserted. In response to the calling, the IC tag for locking operation returns a reflected wave containing identification data which it stores, such as ID code and the like. The first reception means provided to the IC tag monitoring device receives the reflected wave via the antenna for key. Then, the key determination means determines that an authorized key has been inserted and as being normal if the received wave is a reflected wave containing identification data identical to registered data that is registered beforehand within a specified period of time since the first transmission means transmits the calling wave. Further, the first output means outputs the determination result to the outside.

The IC tag is also referred to as a radio frequency-identification (RFID). The IC chip incorporated in the IC tag is the same type as of a non-contact type IC card, and provides communication in non-contact communication. In addition to the ID code specific to the IC tag, an ID of the provided device (manufacturer's ID), a management code of an amusement center (hall ID), and the like can be additionally stored in the memory area within the IC chip as identification data. These IDs are respectively structured by unique information (i.e. information that can be uniquely identified) of about 64 bits. When these IDs are formed into double or triple structure, it becomes very difficult to copy and unfairly utilize these IDs. Since the reflected wave which is transmitted in response to the calling wave contains such identification data, its modification or so-called "disguise" is difficult as compared with light, electricity, and the like. Therefore, if an IC tag is incorporated into an authorized key, the communication is unavailable when a replica of the key is used, and an unfair opening action can be detected or its history can be left. If ID codes of a plurality of keys are registered and which of the keys has been used for unlocking operations is left as a history, it is possible to discover when a deceit action has been made using which key. In addition, if the period of time during which the use of the key is permitted is set in accordance with the work time of the staff who carries the key, by checking the history it is possible to determine whether or not the opening operation has been made by unfair use of the key. In such a case, key use time determination means for determining whether or not the key has been used within the period of time that is registered beforehand may be provided.

Further, in the locking system according to the present invention, said locking device may comprise second reception means for receiving said result of key determination outputted from said first output means, and unlocking means for unlocking operation if said result of key determination received by said second reception means is normal.

In thus-structured locking system, the second reception means receives the result of key determination. If the result is normal, the unlocking means unlocks. Therefore, unlocking is impossible when a replica of the key is used, and a deceit action which would have been made if unlocked can be prevented. The locking system also may further comprises key use time determination means for determining whether or not the key has been used within a period of time that is registered beforehand. In this case, the lock is undone only when the key use time determination means determines that the key has been used within an authorized period of time, in addition that the result of key determination is normal.

Further, in the locking system according to the present invention, said first output means may be arranged so as to output said result of key determination or key monitoring history data, said key monitoring history data comprising at least one of the key insertion time that is the time at which the communication unavailable state in which said first reception means cannot receive said reflected wave has changed into the communication available state in which said first reception means can receive said reflected wave and identification data contained in the received reflected wave, the key withdrawal time that is the time at which said communication available state has changed into said communication unavailable state, and the key ID abnormal time that is the time at which identification data different from the registered data that is registered beforehand is received and identification data contained in the received reflected wave.

In thus-structured locking system, the first output means outputs the result of key determination or the key monitoring history data. The key monitoring history data contains either one of the time at which the communication unavailable state in which said first reception means cannot receive said reflected wave has changed into the communication available state in which said first reception means can receive said reflected wave (key insertion time) and identification data at that point of time, the time at which the communication available state has changed into a communication unavailable state (key withdrawal time), the time at which identification data different from the registered data that is registered beforehand is received (key ID abnormal time) and identification data at that point of time. Therefore, if the key monitoring history data is referred from the outside and it is determined that an abnormality has been occurred, it is possible to alert a staff to the abnormality by means of annunciation using light, sound, and like.

Further, the locking system according to the present invention may comprise an IC tag for monitoring opening/closing operation that stores identification data for identifying said tag from other IC tags and that is provided to an opening/closing member for opening and closing the device or to a device main body in the vicinity of the opening/closing member, wherein said IC tag monitoring device comprises second transmission means for transmitting a calling wave for calling said IC tag for monitoring opening/closing operation, third reception means for receiving a reflected wave returned from said IC tag for monitoring opening/closing operation, an antenna for monitoring connected to said second transmission means and said third reception means, opening/closing operation determination means for determining as being normal if said third reception means receives a reflected wave containing identification data identical to registered data that is registered beforehand within a specified period of time since said second transmission means transmits a calling wave, and second output means for outputting history data of monitoring opening/closing operation containing result of opening/closing operation determination by the opening/closing operation determination means to the outside.

In thus-structured locking system, the second transmission means provided to the IC tag monitoring device calls the IC tag for monitoring opening/closing operation incorporating an IC chip therein by transmitting a calling wave via an antenna for monitoring. Then, the IC tag for monitoring opening/closing operation returns a reflected wave containing identification data such as ID code and the like which the IC tag stores, and the third reception means provided to the IC tag monitoring device receives the reflected wave via the antenna for monitoring. Then, the opening/closing operation determination means determines as being normal if the third reception means receives the reflected wave containing identification data identical to the registered data that is registered beforehand within a specified period of time since the second transmission means transmits the calling wave. Further, the second output means outputs the result of determination to the outside. Therefore, if the IC tag for monitoring opening/closing operation is always located at a position where communication from the antenna is available, and the member to which the IC tag for monitoring opening/closing operation is fixedly attached is moved out of the communication available range and the like, it becomes impossible to receive the reflected wave and communication becomes unavailable. When the member returns from the communication unavailable state to the position where the communication is available again, it becomes possible to receive the reflected wave. With this arrangement, it is possible to detect the changes in the states of the device such as opening or moving operation to the member without depending on visual checking. If the communication unavailability and recovery such as described above are stored and remained in the history, it is possible to distinguish a normal state from a state where a deceit action is made, and monitoring can be performed effectively.

Further, in the locking system according to the present invention, wherein said IC tag monitoring device may comprise annunciation means for making an annunciation if both of said result of key determination and said result of opening/closing operation determination are abnormal.

In thus-structured locking system, the annunciation means makes an annunciation if both of the result of key determination and result of opening/closing operation determination are abnormal. Therefore, if the device is opened by a replica of the key and the like without using an authorized key or if the device is forcedly opened without using a key, it is possible to alert a staff to such unfair opening actions by means of various methods using light, sound and the like.

Further, in the locking system according to the present invention, said antenna for monitoring may be provided to a device main body in the vicinity of said IC tag for monitoring opening/closing operation if said IC tag is provided to said opening/closing member, and may be provided to said opening/closing member in the vicinity of the IC tag for monitoring opening/closing operation if said IC tag is provided to said device main body, wherein said antenna for monitoring and said IC tag for monitoring opening/closing operation can make communication with each other if said opening/closing member is in a closed state, and cannot make communication with each other if said opening/closing member is in an opened state.

In thus-structured locking system, the IC tag for monitoring opening/closing operation and the antenna for monitoring are independently provided to the opening/closing member and the device main body in the vicinity of the opening/closing member. When the opening/closing member is in a closed state, communication is available whereas communication is unavailable when the opening/closing member is opened. If the information is output to the outside or are stored to be left in the history, an unfair opening action aiming to the replacement of the board inside the device can be detected. If such an unfair opening action is notified immediately, a deceit action can be discovered at an early stage.

Further, in the locking system according to the present invention, said history data of monitoring opening/closing operation may comprise at least one of the time of disappearance that is the point of time at which the communication available state in which said third reception means can receive said reflected wave has changed into the communication unavailable state in which said third reception means cannot receive said reflected wave, the time of recovery that is the point of time at which said communication unavailable state has changed into said communication available state, and the time of ID abnormality that is the point of time at which identification data different from the registered data that has been registered beforehand has received.

In thus-structured locking system, the history data of monitoring opening/closing operation outputted by the second output means contains either one of the point of time at which the communication available state in which said third reception means can receive said reflected wave has changed into the communication unavailable state in which said third reception means cannot receive said reflected wave ("time of disappearance"), the time at which the third reception means has recovered into a state that it can receive the reflected wave again ("time of recovery"), and the time at which identification data different from the registered data which is registered beforehand has been received due to an unauthorized replacement of the IC tag and the like ("time of ID abnormality"). The outputted history data of monitoring opening/closing operation is used for making an annunciation at the external device, or is stored in the external device so that the monitoring history of the IC tag for monitoring opening/closing operation can be referred later. In addition, since the accurate time at which a deceit action has made can be known, if a surveillance camera is provided to an amusement center and the like which includes a device provided with the monitoring system, a person who has made the deceit action can be specified by comparing the time left in the locking system with the photographing time by the surveillance camera.

Next, a locking system according to the second invention of the present application comprises an IC tag for locking operation, an IC tag for monitoring opening/closing operation, an IC tag monitoring device that makes communication with said IC tag for locking operation and said IC tag for monitoring opening/closing operation, and a locking device that locks and unlocks a device based on a result of monitoring made by the IC tag monitoring device, wherein said IC tag for locking operation stores identification data that is used for distinguishing the IC tag from other IC tags, wherein said IC tag for monitoring opening/closing operation is provided to an opening/closing member that is opened and closed from the device or to a device main body in the vicinity of the opening/closing member, wherein said IC tag monitoring device includes transmission means for transmitting a calling wave for calling said IC tag for locking operation or said IC tag for monitoring opening/closing operation, reception means for receiving a reflected wave returned from said IC tag for locking operation or said IC tag for monitoring opening/closing operation, an antenna that is connected to said transmission means and said reception means, determination means for determining as being abnormal if said reception means does not receive a reflected wave containing identification data identical to registered data that is registered beforehand within a specified period of time since said transmission means transmits a calling wave to the IC tag for monitoring opening/closing operation and if said reception means does not receive a reflected wave containing identification data identical to registered data that is registered beforehand within a specified period of time since said transmission means transmits a calling wave to said IC tag for locking operation, and output means for outputting the result of determination made by said determination means to the outside, and wherein said locking device comprises a key including said IC tag for locking operation and a lock that includes said antenna and into which said key is to be inserted.

In thus-structured locking system, the transmission means in the IC tag monitoring device transmits a calling wave to the IC tag for locking operation incorporated in the key and the IC tag for monitoring opening/closing operation provided to the opening/closing member that is opened and closed from the device or to a device main body in the vicinity of the opening/closing member, so as to call these IC tags. In response to the calling, the IC tag for locking operation and IC tag for monitoring opening/closing operation respectively return a reflected wave containing identification data such as ID code which they store, and the reception means receives the reflected waves. If the reception means does not receive reflected waves containing identification data identical to the registered data that is registered beforehand from neither of IC tags within a specified period of time since the transmission means transmits the calling wave, the determination means determines as being abnormal. Further, the output means outputs the determination result to the outside. Therefore, if the IC tag is incorporated in an authorized key, it is determined as being normal when the device is opened using the authorized key, whereas it is determined as being abnormal when the device is opened using a replica of the key or is forcedly opened without using a key. With this arrangement, an unfair opening action can be detected or can be left in the history. If ID codes of a plurality of keys are registered and which of the keys has been used for unlocking operation is left as a history, it is possible to discover when a deceit action has been made using which key. In addition, if the period of time during which the use of the key is permitted is set in accordance with the work time of the staff who carries the key, it is possible to determine whether or not the opening operation has been made by unfair use of the key. In such a case, if the key determination means determines as being normal, key use time determination means for determining whether or not the key has been used within the period of time that is registered beforehand may be provided.

Next, a game machine according to the third invention of the present application comprises the locking system according to the first invention or the locking system according to the second invention. Thus-structured game machine can achieve the function and effect of the first invention or the second invention.

Next, a device management system according to the fourth invention of the present application in which a device that includes the locking system according to the first invention is connected with a management machine that manages the device via a network, wherein said management machine comprises monitoring history data reception means for receiving said result of key determination that is outputted from said first output means or said key monitoring history data, or for receiving said history data of monitoring opening/closing operation outputted from said second output means.

In thus-structured device management system, the monitoring history data reception means in the management machine receives the result of key determination or key monitoring history data outputted from the first output means of the IC tag monitoring device, and the history data of monitoring opening/closing operation outputted from the second output means. Therefore, the monitoring history data of the respective devices can be recognized at the management machine, and necessary measures can be taken at an early stage.

Further, in the device management system according to the present invention, said management machine may comprise monitoring history data storage means for storing said result of key determination or said key monitoring history data that said monitoring history data reception means has received or for storing said history data of monitoring opening/closing operation.

In thus-structured device management system, the monitoring history data storage means of the management machine stores the received result of key determination, key monitoring history data, and history data of monitoring opening/closing operation. Therefore, all of the monitoring history data of the respective devices are stored at the management machine side, and flexible measurement can be taken such as, for example, clearing the details of storage in the IC monitoring device or comparing monitoring histories of a plurality of devices with each other, and the like.

Further, in the device management system according to the present invention, said management machine may comprise monitoring history data output means for outputting said result of key determination or said key monitoring history data that said monitoring history data reception means has received or for outputting said history data of monitoring opening/closing operation.

In thus-structured device management system, the monitoring history data output means of the management machine outputs the received result of key determination, key monitoring history data, and the history data of monitoring opening/closing operation. Therefore, measurement to deceit actions and the like can be efficiently taken by displaying all of the monitoring histories of a plurality of devices at a single location or making an annunciation of the deceit actions using an alarm lamp, sounds, and the like.

BRIEF DESCRIPTION OF THE DRAWINGS

FIG. 20 is a schematic diagram of a history database.

BEST MODE FOR CARRYING OUT THE INVENTION

Figure 1:
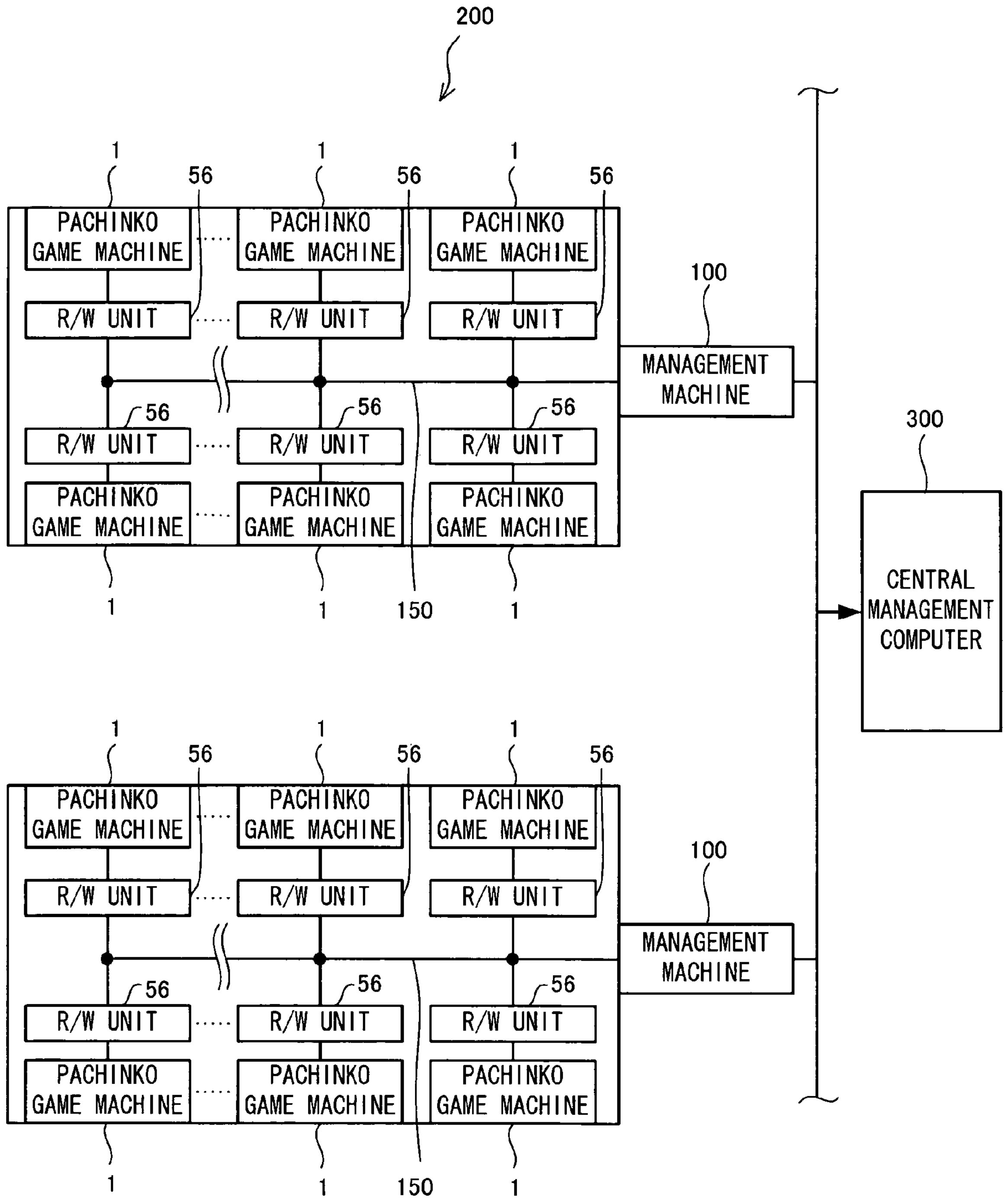
FIG. 1 is a system structural diagram of a management system 200.

Hereinafter, an embodiment of the present invention will be described in the following order with reference to the drawings.

1. Brief description of the system structure
2. Description of the structure of the device
3. Description of the structure of the inventive elements
4. Description of the structure of the hardware inside the device
5. Description of the structure of the inventive hardware elements
6. Description of the operations of the inventive elements
7. Effects of the embodiment
8. Description of the exemplified modifications

1. Brief Description of the System Structure

FIG. 1 is a structural diagram of a management system 200 of a game machine in an amusement center as an embodiment of the present invention. In the management system 200, game machine placement islands, each including a plurality of pachinko game machines 1 in the amusement center arranged in two lines back to back with each other, are respectively provided with a management machine 100, and the pachinko game machines (game machines) 1 placed in the game machine placement island are connected to the management machine 100 via a reader/writer unit (hereinafter, referred to as a "R/W unit") 56. The pachinko game machine 1 is provided with a glass frame 111, a main body frame 110, and IC tags for monitoring opening/closing operation that store ID codes (identification data) respectively for monitoring opening/closing operation between the glass frame 111 and the main body frame 110 and between the main body frame 110 and the wooden frame 112 (see FIG. 6). A calling wave is transmitted to the IC tags for monitoring opening/closing operation and the reflected waves therefrom are received, and the ID codes contained in the reflected waves are read so as to detect that the location provided with the IC tag has been opened. The detected result is transmitted to the management machine 100 for allowing the management machine 100 to make an annunciation, so that any proper action can be taken within the amusement center. An IC tag for key is incorporated in a key 121 for use in opening and closing the glass frame 111 and main body frame 110 (see FIG. 10). The ID code of the IC tag for key is read, and the frame is unlocked only when the ID code is true one. Further, a history of insertion and withdrawal of the key is transmitted to the management machine 100. In the management system 200, each of the R/W units 56 is connected with the management machine 100 via a communication cable 150 such as a LAN cable. Each of the pachinko game machines 1 includes an independent R/W unit 56 (IC tag monitoring device) for calling IC tags and reading identification data therefrom. The management machine 100 is connected to a central management computer 300 which further manages the overall amusement center. The central management computer 300 entirely manages each of the management machines 100.

2. Description of the Structure of the Device

Figure 2:
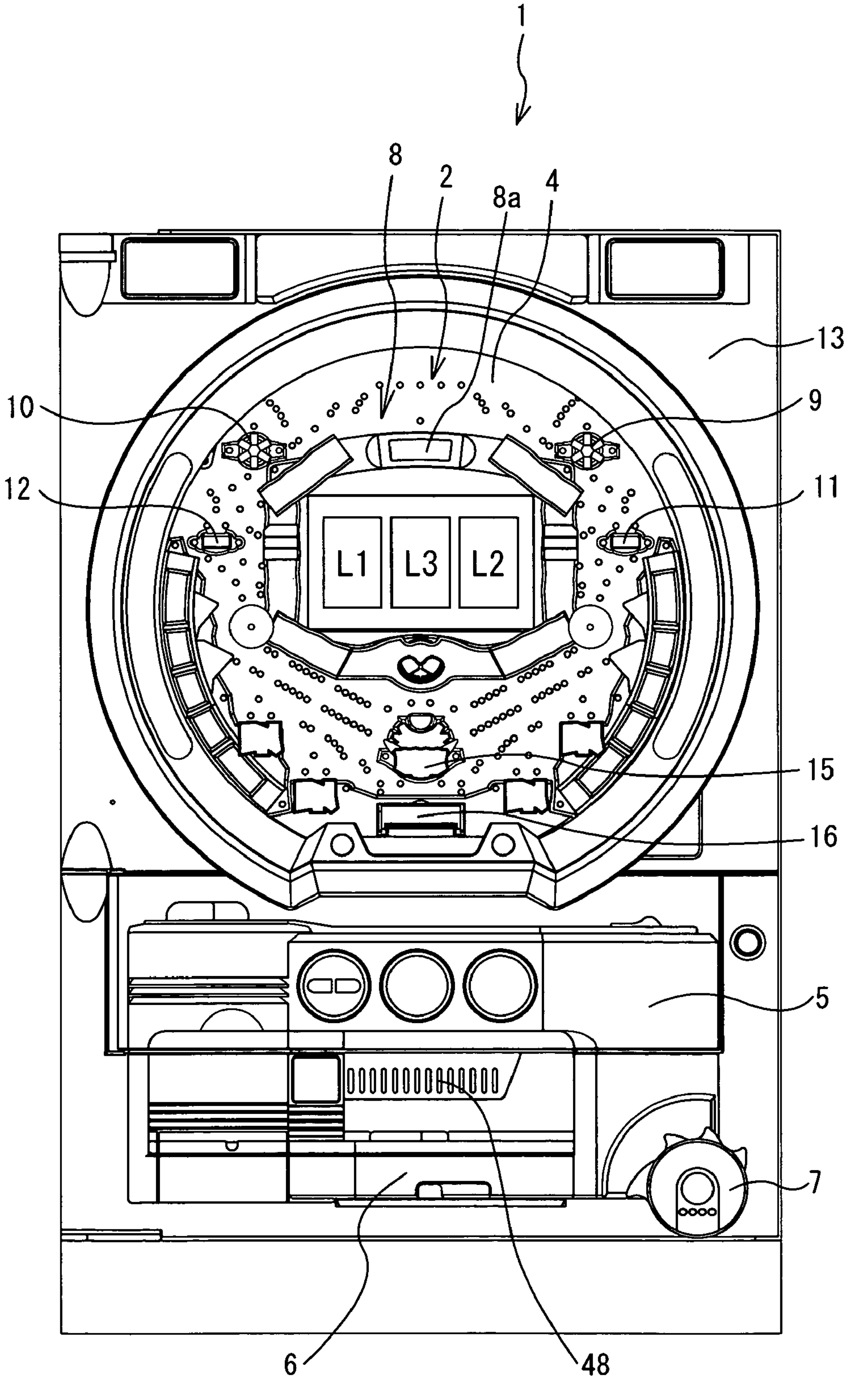
FIG. 2 is a front view of a pachinko game machine 1.
Figure 3:
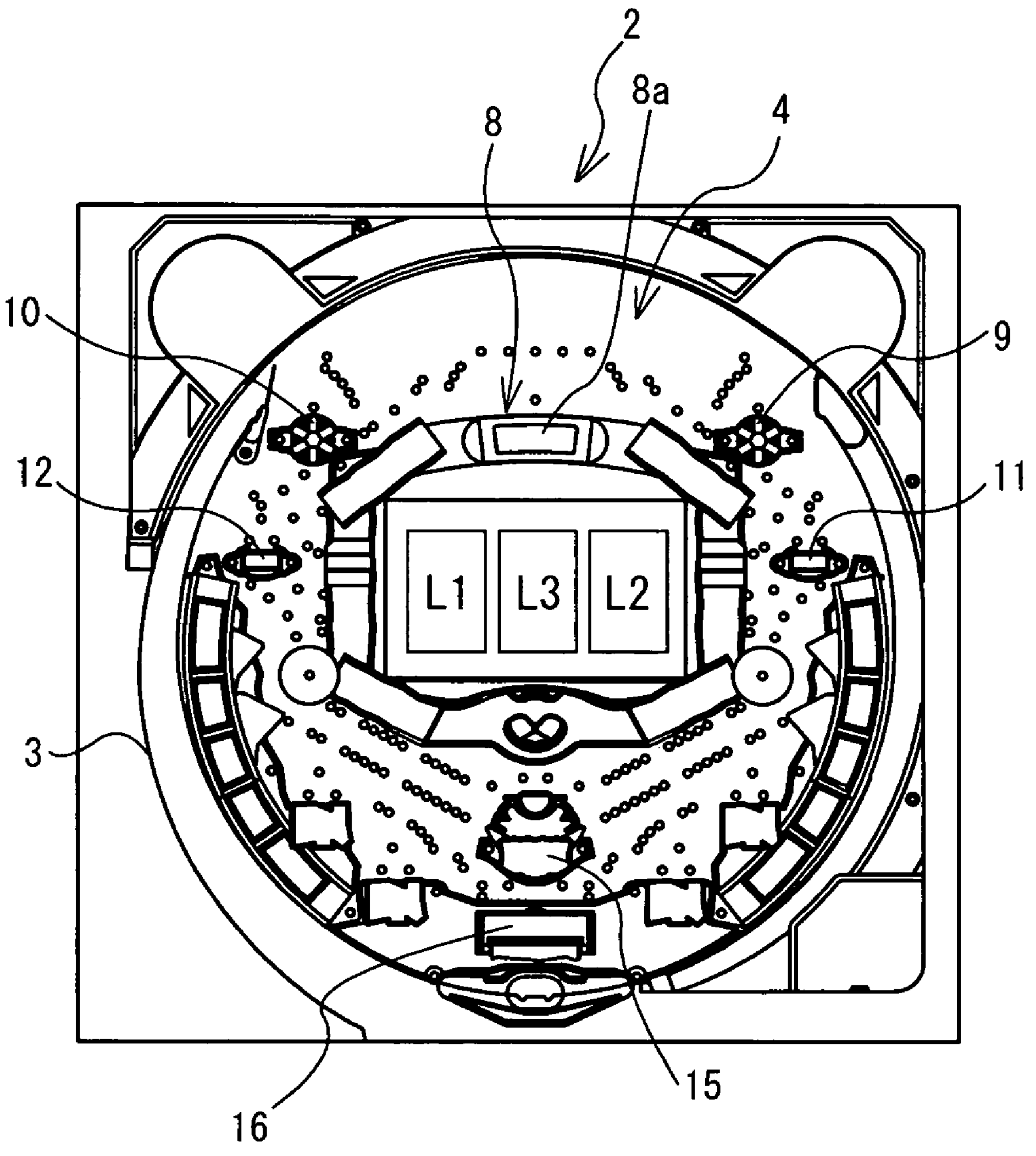
FIG. 3 is a front view of a game board 2 of the pachinko game machine 1.

FIG. 2 is a front view of the pachinko game machine 1, and FIG. 3 is a front view of a game board 2 of the pachinko game machine 1. As shown in FIGS. 2 and 3, the substantially square-shaped game board 2 is provided at an upper half of front side of the pachinko game machine 1. The game board 2 has a substantially round-shaped game area 4 surrounded by a guide rail 3. The game board 2 has a game area 4 at its center on a front surface, and is covered with a glass frame 111 that holds a transparent glass plate. At a lower portion of the game board 2 of the pachinko game machine 1, an upper tray 5 is provided for supplying game balls to an unillustrated launching machine and receiving prize balls. Immediately below the upper tray 5, a lower tray 6 is provided for receiving prize balls. A launching handle 7 is provided at a right side of the lower tray 6, and a speaker 48 is provided between the upper tray 5 and the lower tray 6. A keyhole 120 into which a key for opening the glass frame 111 or main body frame 110 (see FIG. 6) is to be inserted is formed at a position above the launching handle 7.

A special design display device 8 having a liquid crystal display screen is provided in the substantial center of the game area 4. The special design display device 8 includes a first design stop portion L1, a second design stop portion L2, a third design stop portion L3, and an ordinary design display portion 8*a*. The ordinary design display portion 8*a* can display a number in single figure, a single alphabet, or a design such as a symbol and a mark. An illuminated windmill 9 is provided above right of the special design display device 8 and an illuminated windmill 10 is provided above left of the special design display device 8. Further, the special design display device 8 is provided with an ordinary design startup gate 11 at its right side, and is also provided with an ordinary design startup gate 12 at its left side. In addition, a special design startup device 15 is provided below the special design display device 8, and the big scoring hole 16 is provided below the special design startup device 15. The game board 2 also includes, on top of the above, various illumination lamps, windmills, a large number of obstruction pegs, and the like.

Figure 4:
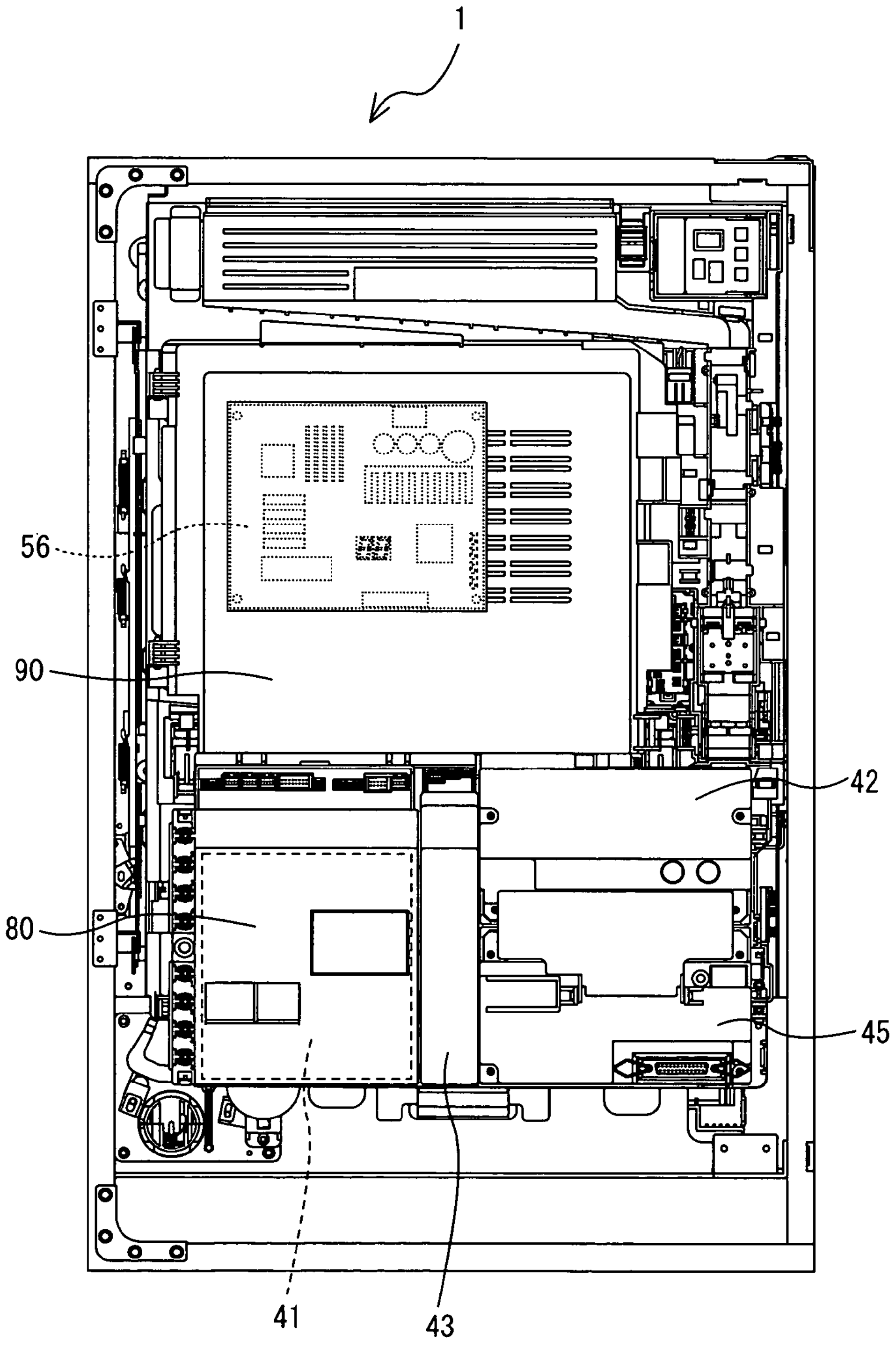
FIG. 4 is a backside view of the pachinko game machine 1.

Next, a structure of the backside of the pachinko game machine 1 will be described with reference to FIG. 4. FIG. 4 is a backside view of the pachinko game machine 1. As shown in FIG. 4, the board box 80 in which the main control board 41 for performing main control to the pachinko game machine 1 is contained is provided at the lower left side on the backside of the pachinko game machine 1. A sound board 43 is located next to the right side of the board box 80, and an electric power board 42 is located next to the upper right of the soundboard 43, and an ejection control board 45 is located below the electric power board 42. The soundboard 43, the electric power board 42, and the ejection control board 45 are respectively contained in a transparent resin box. A center covering 90 is located above the board box 80 for protecting the backside of the game board and covering various wirings. The R/W unit 56 for calling an IC tag and reading the ID code therefrom is provided at the outside of the center covering 90.

3. Description of the Structure of the Inventive Elements

Figure 5:
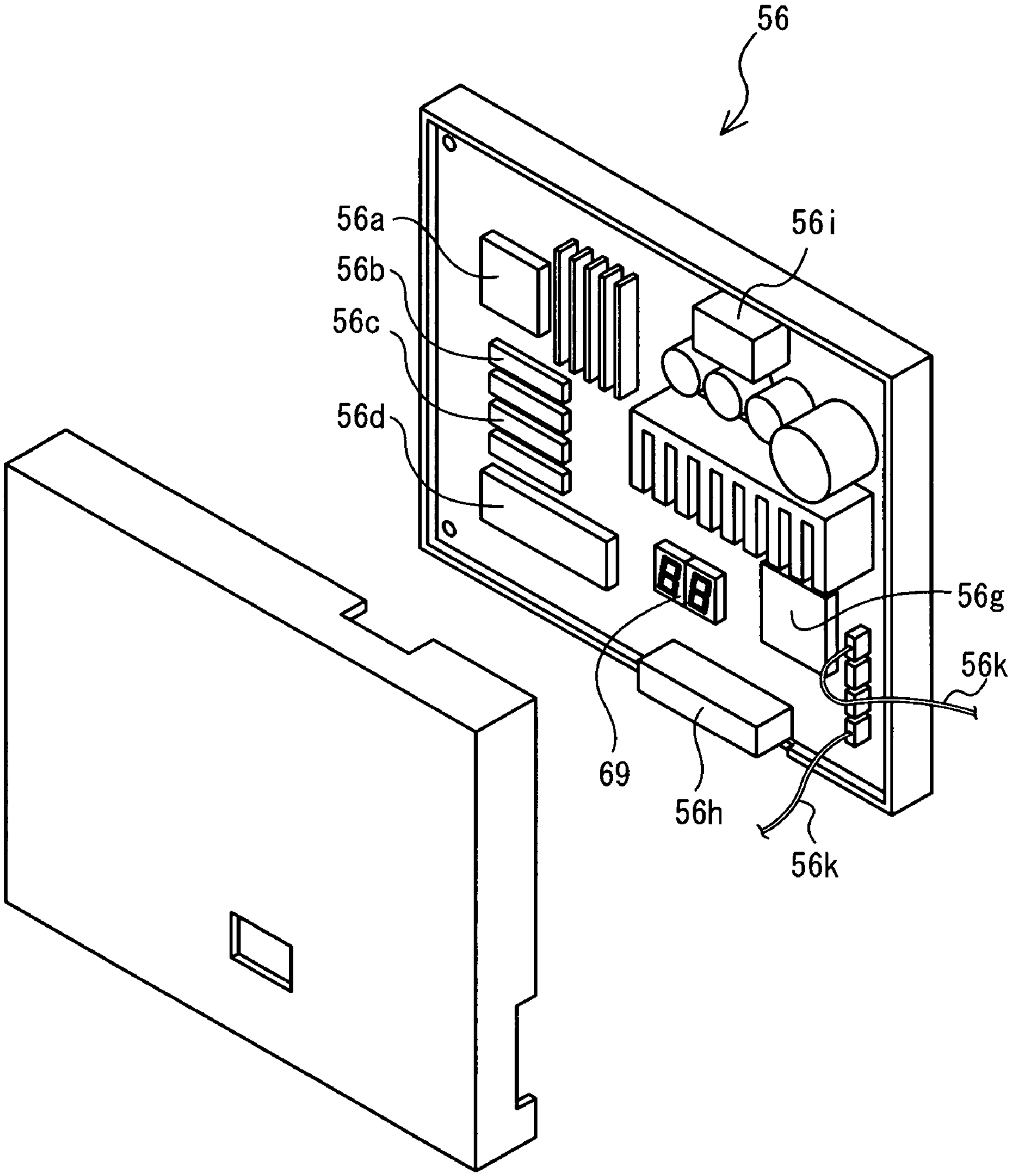
FIG. 5 is an exploded perspective view of an R/W unit 56.

Next, the R/W unit 56, used as an IC tag monitoring device, will be described by way of FIG. 5. FIG. 5 is an exploded perspective view of the R/W unit 56. As shown in FIG. 5, the R/W unit 56 is attached by pegs to the outside of the center covering 90 above the board box 80 (see FIG. 4). The R/W unit 56 is structured as a unit independent from the pachinko game machine 1 and supplied with an electric power from the game machine placement island. As shown in FIG. 5, the R/W unit 56 includes a CPU 56*a*, RAM 56*b*, ROM 56*c*, EEPROM 56*d*, RF circuit 56*g*, LAN card 56*h*, and input port 56*i*. The R/W unit 56 is connected with antennas for monitoring 68, 168 (described later) from the RF circuit 56*g* through a coaxial cable 56*k*, and is connected with the management machine 100 from the LAN card 56*h* through the LAN cable. Further, the R/W unit 56 receives a signal from the main control board 41 of the pachinko game machine 1 via the input port 56*i*. The R/W unit 56 performs wireless communication with IC tags for monitoring opening/closing operation 86, 186 via the antennas for monitoring 68, 168, and performs wireless communication with an IC tag for key 126 incorporated in the key 121 (see FIG. 10) via the antenna for key 128. Further, the R/W unit 56 also includes a seven-segmented display unit 69 which lights up when any abnormality occurs in the communications with the IC tag for monitoring opening/closing operation 86 or 186 and IC tag for key 126. When the IC tags for monitoring opening/closing operation come into a state that they cannot be identified or an error occurs in their IDs and an abnormality in opening/closing operation is determined at the location where the pachinko game machine 1 is placed, or when the inserted key 121 has come into an ID error state, the seven-segmented display unit 69 specifies the location where the abnormality has occurred (for example, by means of a mark such as A or B) and displays an accumulated total number of times that the abnormalities (opening/closing operation) have occurred.

Figure 6:
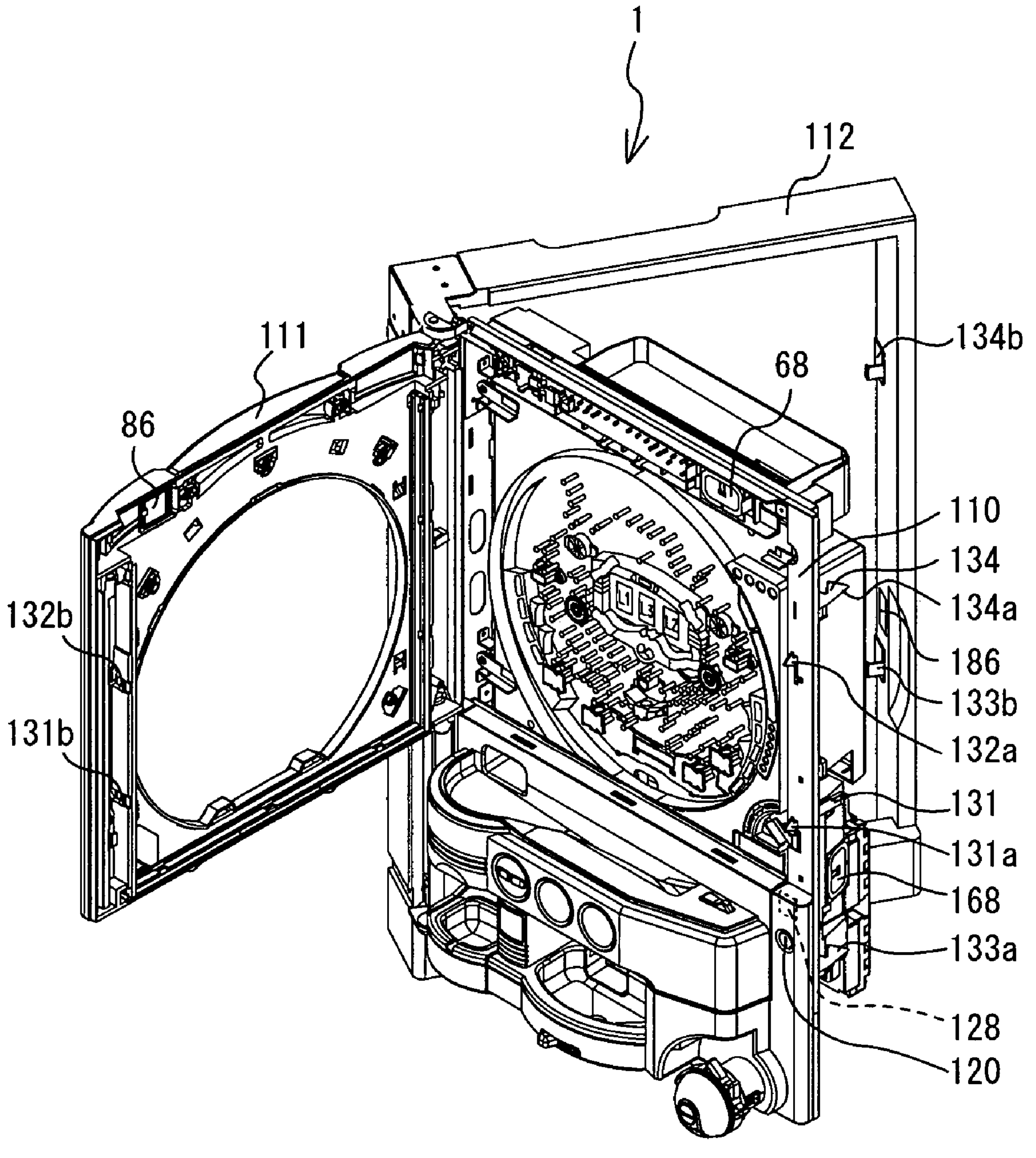
FIG. 6 is a perspective view showing a state where a glass frame 111 and a main body frame 110 of the pachinko game machine 1 is opened.
Figure 7:
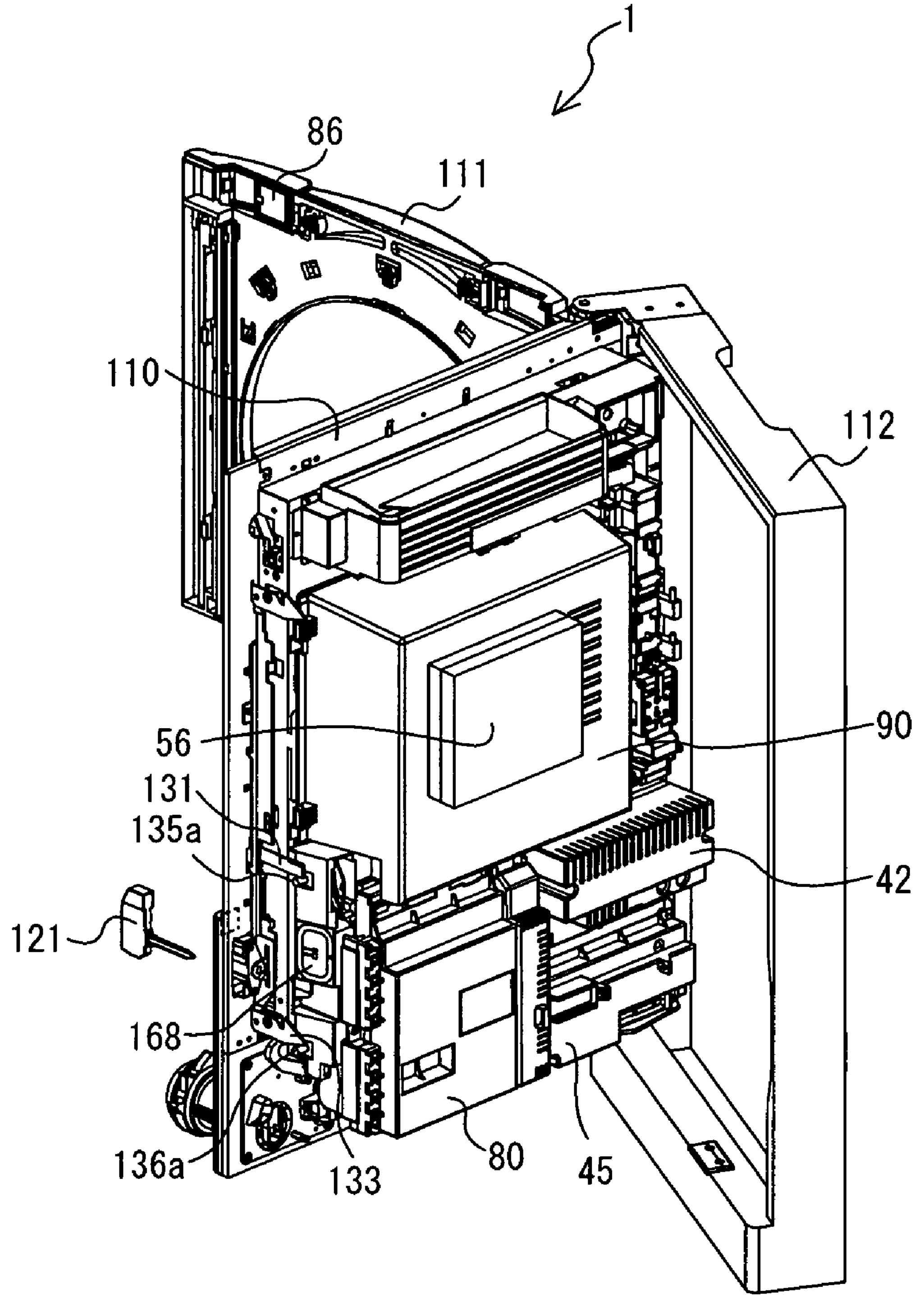
FIG. 7 is a perspective view showing a state where the glass frame 111 and the main body frame 110 of the pachinko game machine 1 is opened.

Next, a structure for opening and closing the pachinko game machine 1 will be described with reference to FIGS. 6 and 7. FIGS. 6 and 7 are perspective views respectively showing the state where a glass frame 111 and main body frame 110 of the pachinko game machine 1 are opened. As shown in FIG. 6, the pachinko game machine 1 includes a wooden frame 112 fixed to a game machine placement island, a main body frame 110 as a game machine main body, and a glass frame 111 for protecting the game board 2. Opening and closing of the wooden frame 112 from main body frame 110 and of the main body frame 110 from the glass frame 111 are made by inserting a key 121 into a key hole 120 and turning the key 121.

As shown in FIGS. 6 and 7, an IC tag for monitoring opening/closing operation 86 in a small size and rectangular shape is attached to the backside of the glass frame 111 at its upper right portion when seen from the front by an adhesive agent and the like. At the upper right portion of the opposing main body frame 110 when seen from the front, an antenna for monitoring 68 in a small size and rectangular shape is attached by an adhesive agent and the like. Further, an IC tag for monitoring opening/closing operation 186 in a small size and rectangular shape is attached to a substantial center of the inside of the right side of the wooden frame 112 when seen from the front by an adhesive agent and the like. At the right surface of the opposing main body frame 110 when seen from the front, an antenna for monitoring 168 in a small size and rectangular shape is attached by an adhesive agent and the like. Further, an antenna for key 128 in a small size and rectangular shape is provided in a buried state above the keyhole 120.

Figure 8:
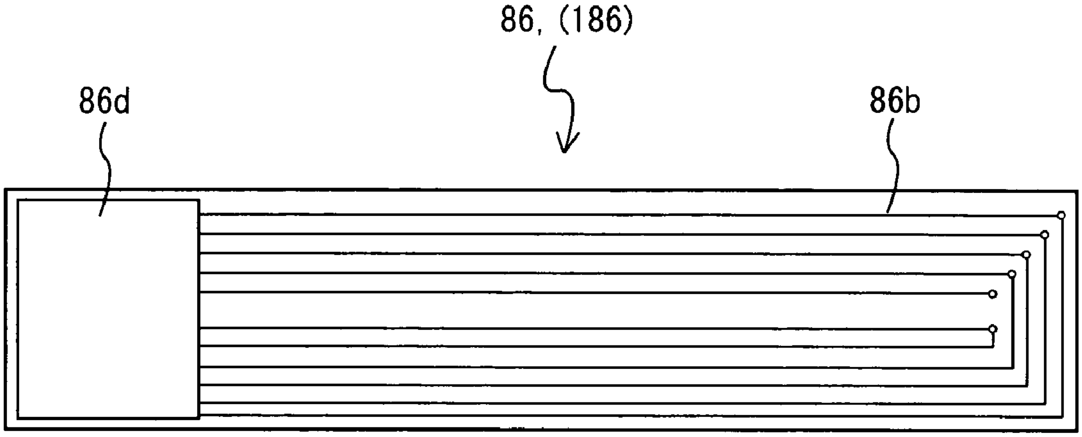
FIG. 8 is a plan view of IC tags 86 and/or 186.

Here, a structure of the IC tags for monitoring opening/closing operation 86, 186 will be described. FIG. 8 is a plan view of the IC tags for monitoring opening/closing operation 86, 186. As shown in FIG. 8, the IC tags for monitoring opening/closing operation 86, 186 respectively include an IC chip 86*d* in which an RF circuit 86*a* and an EEPROM 86*c* (see FIG. 14) are integrally formed on a thin flexible printed board, and an antenna circuit 86*b*.

Further, the antennas for monitoring 68, 168 perform RF (radio frequency wireless) transmission and reception with the IC tags for monitoring opening/closing operation 86, 186 by means of electromagnetic waves. The antenna for key 128 performs RF transmission and reception with the IC tag for key 126 by means of electromagnetic waves (see FIG. 10). The antennas 68, 168 and 128 are connected with the R/W unit 56 by the coaxial cable 56*k*. In this embodiment, the IC tags for monitoring opening/closing operation 86, 186 perform communication with the antenna for monitoring 68, 168 at a short wave bandwidth of 13.56 MHz, and the IC tag for key 126 performs communication with the antenna for key 128 at a short wave bandwidth of 13.56 MHz. The antenna for monitoring 68 and the IC tag for monitoring opening/closing operation 86, and the antenna for monitoring 168 and the IC tag for monitoring opening/closing operation 186 are located so that their distance is about 3 mm in a state that the glass frame 111 and the main body frame 110 are closed and locked, and that the main body frame 110 and the wooden frame 112 are closed and locked. At this distance, the RF transmission and reception is possible, and the IC tags for monitoring opening/closing operation 86, 186 can respond to the calling from the R/W unit 56 via the antennas for monitoring 68, 168. On the other hand, the antennas for monitoring 68 and 168 and the IC tags for monitoring opening/closing operation 86, 186 are designed so that the communication therebetween is impossible if the distance exceeds about 5 mm. This communication available distance is adjustable by the number of turns of coils of the antenna for monitoring 68 or a reactance value. Since the communication available distance is set in this manner, it is possible to detect even a situation that the glass frame 111 or main body frame 110 is slightly opened. In addition, the communication available distance is adjusted in such a manner that a slight swing due to vibration and the like does not cause unavailability of the communication. Further, the IC tag for key 126 and the antenna for key 128 are structured in such a manner that the communication therebetween is available when the key 121 is inserted into the keyhole 120, whereas the communication therebetween is unavailable when the key 121 is withdrawn from the key hole 120.

The communication between the antennas for monitoring 68, 168 and the IC tags for monitoring opening/closing operation 86, 186, and the communication between the antenna for key 128 and the IC tag for key 126 are performed using electromagnetic waves. Therefore, in order to prevent erroneous actions caused by noise from a member in which electromagnetic wave is used, the IC tags for monitoring opening/closing operation 86, 186, antenna for monitoring 68, 168, and antenna for key 128 are located apart from the locations where a prize ball ejecting device 49 and a launching motor 67 in which solenoid is used (described later) are present.

Figure 9:
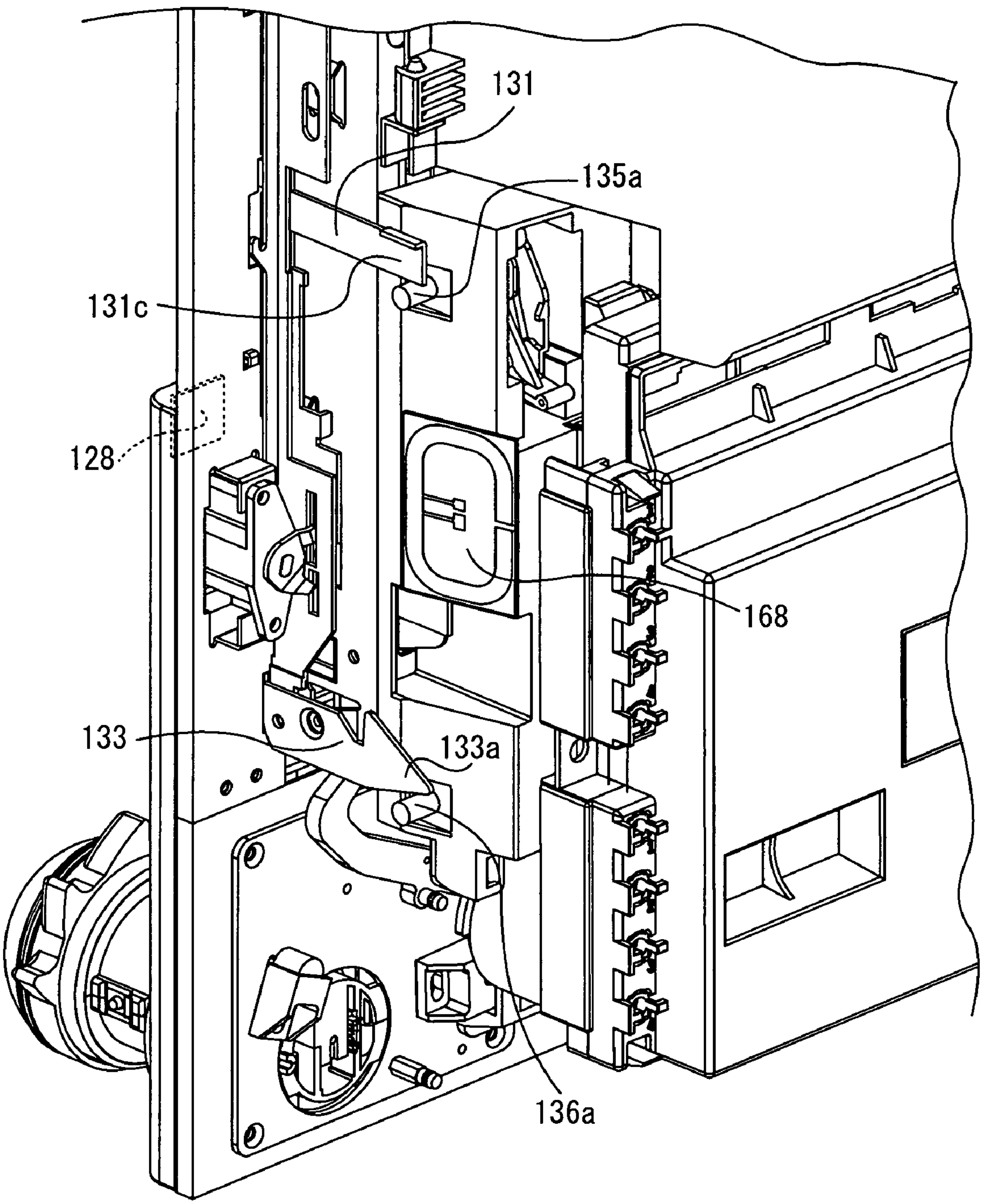
FIG. 9 is a partial perspective view showing a lower portion of the main body frame 110.

Next, a structure for locking and unlocking between the glass frame 111 and main body frame 110, and between the main body frame 110 and wooden frame 112 will be described using FIGS. 6 and 9. FIG. 9 is a partial perspective view of a lower portion of the main body frame 110. As shown in FIG. 6, the glass frame 111 and the main body frame 110 are locked with each other by engagement of a projecting portion 131*a* of a stopper member 131 with an engaging portion 131*b* of the glass frame 111 and engagement of a projecting portion 132*a* of a stopper member 132 with an engaging portion 132*b* of the glass frame 111. The stopper members 131, 132 are always forced upward by springs. Further, as shown in FIG. 9, in a locked state, the projecting portion 131*a* of the stopper member 131 and an end portion 131*c* at an opposed side are in contact with a plunger 135*a* provided above the antenna for monitoring 168 at their lower ends. The plunger 135*a*, which is a movable iron core of a solenoid for locking operation 135 (see FIG. 12), is attracted inward when a current flows through the solenoid for locking operation 135 to be turned ON, and is not in contact with the projecting portion 131*a* any more.

As shown in FIG. 6, the main body frame 110 and the wooden frame 112 are locked with each other by engagement of a projecting portion 133*a* of a stopper member 133 with an engagement portion 133*b* of the wooden frame 112, and engagement of a projecting portion 134*a* of a stopper member 134 with an engagement portion 134*b* of the wooden frame 112. The stopper members 133 and 134 are always forced upward by springs. Further, as shown in FIG. 9, in the locked state, the projecting portion 133*a* of the stopper member 133 is in contact with a plunger 136*a* provided below the antenna 168 for monitoring at its lower end. The plunger 136*a*, which is a movable iron core of a solenoid 136 for locking operation (see FIG. 10), is attached inward when a current flows through the solenoid 136 for locking operation to be turned ON, and is not in contact with the projecting portion 133*a* any more.

Figure 10:
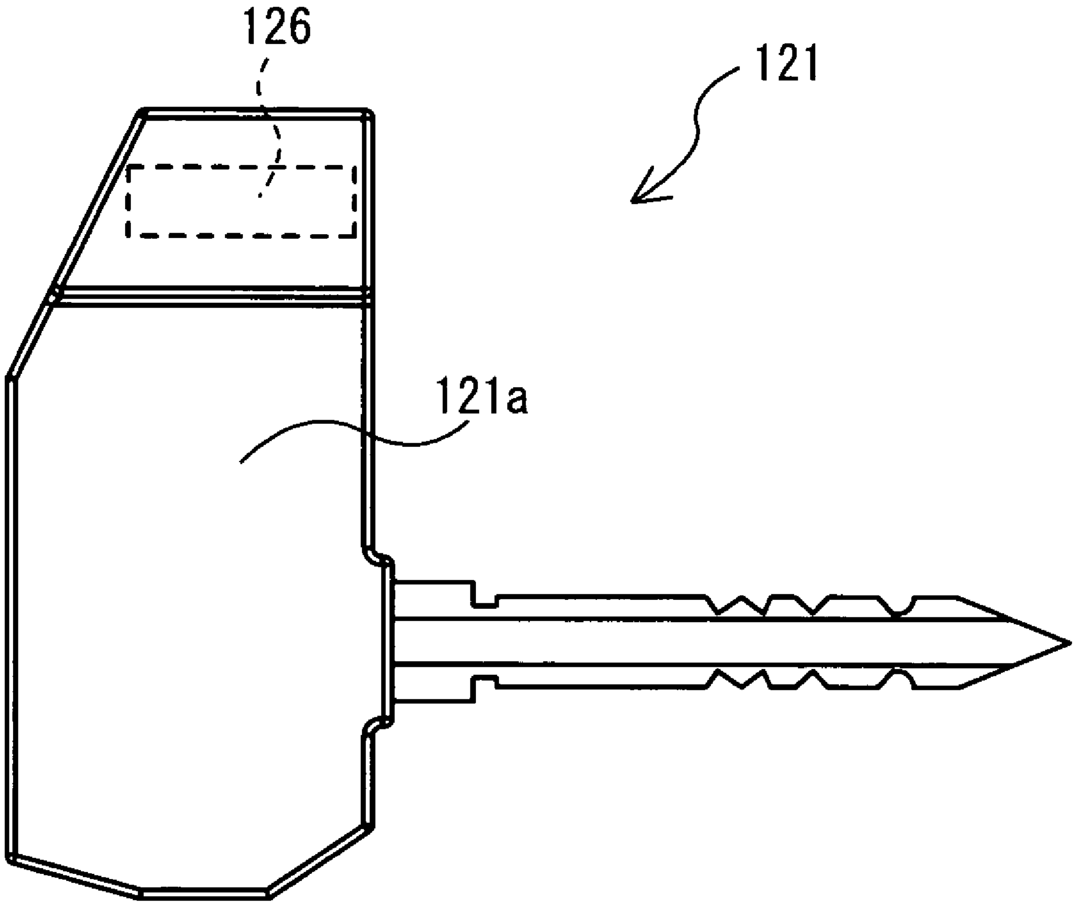
FIG. 10 is a plan view of a key 121.

In order to open the glass frame 111 and main body frame 110, they are unlocked using the key 121. Here, a structure of the key 121 will be described using FIG. 10. FIG. 10 is a plan view of the key 121. As shown in FIG. 10, the key 121 includes the IC tag for key 126 buried in a covering of a gripping portion 121*a*. The IC tag for key 126 is formed into a cylindrical shape with a small diameter (i.e. a shape of stick), and includes an IC chip in which an RF circuit and EEPROM are integrally formed into one piece unit, and an antenna circuit, as is the case with the IC tag for monitoring opening/closing operation 86.

In order to unlock the glass frame 111, the key 121 is inserted into the keyhole 120 and is turned in a left direction. Consequently, the stopper members 131 and 132 move downward and the engagement between the projecting portion 131*a* and the engagement portion 131*b* and the engagement between the projecting portion 132*a* and the engagement portion 132*b* are cancelled, and the glass frame 111 can be opened toward a person who is opening the glass frame 111. However, since the plunger 135*a* is in contact with the stopper member 131 from its bottom, the stopper member 131 is stopped by the plunger 135*a* and cannot move downward even when the key 121 is rotated. Since the R/W unit 56 is always calling the IC tag for key 126 of the key 121 through the antenna for key 128, the ID code of the IC tag for key 126 is read when the key 121 is inserted. If the read ID code coincides with the ID code which has been registered beforehand, the R/W unit 56 allows a current to flow through the solenoid for locking operation 135, allows the plunger 135*a* to be withdrawn so that the stopper member 131 can move downward. As a result, the glass frame 111 is unlocked and can be opened toward a person who is opening the glass frame 111. In order to lock the glass frame 111, the key 121 is not needed. Pushing the glass frame 111 into the main body frame

110 causes the projecting portions 131*a* and 132*a* to be depressed by the engagement portions 131*b* and 132*b*, and further pushing the glass frame 111 into the main body frame 110 causes the projecting portions 131*a* and 132*a* to be detached from the engagement portions 131*b* and 132*b* and causes the stopper members 131 and 132 to move upward by the forces of springs so as to be engaged. As a result, the glass frame 111 is locked. The R/W unit 56 becomes aware that the glass frame 111 has been pushed into the main body frame 110 from the fact that the communication with the IC tag for monitoring 86 has become available again. Then, the R/W unit 56 shuts down the current flowing into the solenoid for locking operation 135 and allows the plunger 135*a* to project forward so as to prevent the stopper member 131 from moving downward.

In order to unlock the main body frame 110, the key 121 is inserted into the keyhole 120 and is turned in a right direction. Consequently, the stopper members 133, 134 move downward and the engagement of the projecting portion 133*a* with the engagement portion 133*b* and the engagement of the projecting portion 134*a* with the engagement portion 134*b* are cancelled, and the main body frame 110 can be opened toward a person who is opening the main body frame 110. In this case, as is the case of the glass frame 111, as shown in FIG. 9, since the plunger 136*a* is in contact with the stopper member 133 from its bottom, the stopper member 133 is stopped by the plunger 136*a* and cannot move downward even when the key 121 is rotated. Since the R/W unit 56 is always calling the IC tag for key 126 of the key 121 through the antenna for key 128, the ID code of the IC tag for key 126 is read when the key 121 is inserted. If the read ID code coincides with the ID code which has been registered beforehand, the R/W unit 56 allows a current to flow through the solenoid for locking operation 136, allows the plunger 136*a* to be withdrawn so that the stopper member 133 can move downward. As a result, the main body frame 110 is unlocked and can be opened toward a person who is opening the main body frame 110. In order to lock the main body frame 110, the key 121 is not needed. Pushing the main body frame 110 into the wooden frame 112 causes the projecting portions 133*a* and 134*a* to be depressed by the engagement portions 133*b*, 134*b*, and further pushing the main body frame 110 into the wooden frame 112 causes the projecting portions 133*a*, 134*a* to be detached from the engagement portions 133*b*, 134*b* and causes the stopper members 133, 134 to move upward by the forces of springs so as to be engaged. As a result, the main body frame 110 is locked. The R/W unit 56 becomes aware that the main body frame 110 has been pushed into the wooden body frame 112 from the fact that the communication with the IC tag for monitoring 186 has become available again. Then, the R/W unit 56 shuts down the current flowing into the solenoid for locking operation 136 and allows the plunger 136*a* to project forward so as to prevent the stopper member 133 from moving downward.

Figure 11:
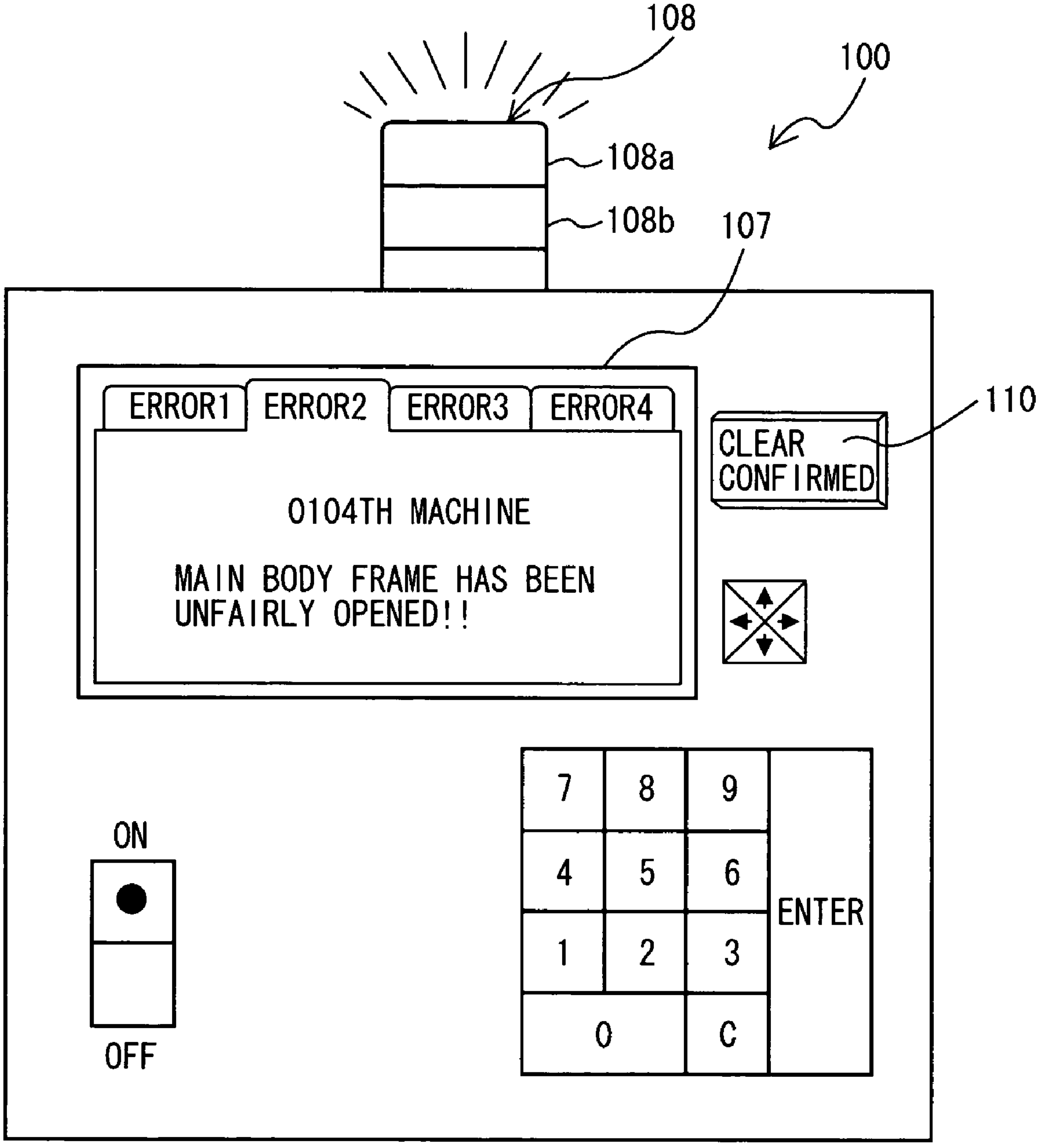
FIG. 11 is a front view of a management machine 100.

Next, a structure of the management machine 100 will be described with reference to FIG. 11. FIG. 11 is a front view of the management machine 100. A shown in FIG. 11, the management machine 100 includes an alarm lamp 108 at its upper portion, a display unit 107 at its front portion, and a clear button 110 for erasing the display on the display unit 107. The alarm lamp 108 includes, at its upper side, a red lamp 108*a* for making an annunciation that the main body frame 110 has been opened, and also includes, at its lower side, a blue lamp 108*b* for making an annunciation that the glass frame 111 has been opened unfairly. When an unfair opening action in which the main body frame 110 or glass frame 111 has been unfairly opened without using the authorized key 121 is detected at any one of the pachinko game machines 1 connected to the management machine 100, and this detection result is notified to the management machine 100, the alarm lamps 108*a* and/or 108*b* illuminate to attract the attention of the staffs of the amusement center. The display unit 107 displays which location of which pachinko game machine 1 has been detected as having been opened. In FIG. 11, the display unit 107 displays that the main body frame 110 of the $104^{th}$ pachinko game machine 1 has been unfairly opened, and the red lamp 108*a* illuminates. The alarm lamp 108 turns off after about 5 seconds. The display on the display unit 107 can be erased when a staff inputs a administrative right through a secret identification number and the like and then presses a clear button 110.

4. Description of the Structure of the Hardware Inside the Device

Figure 12:
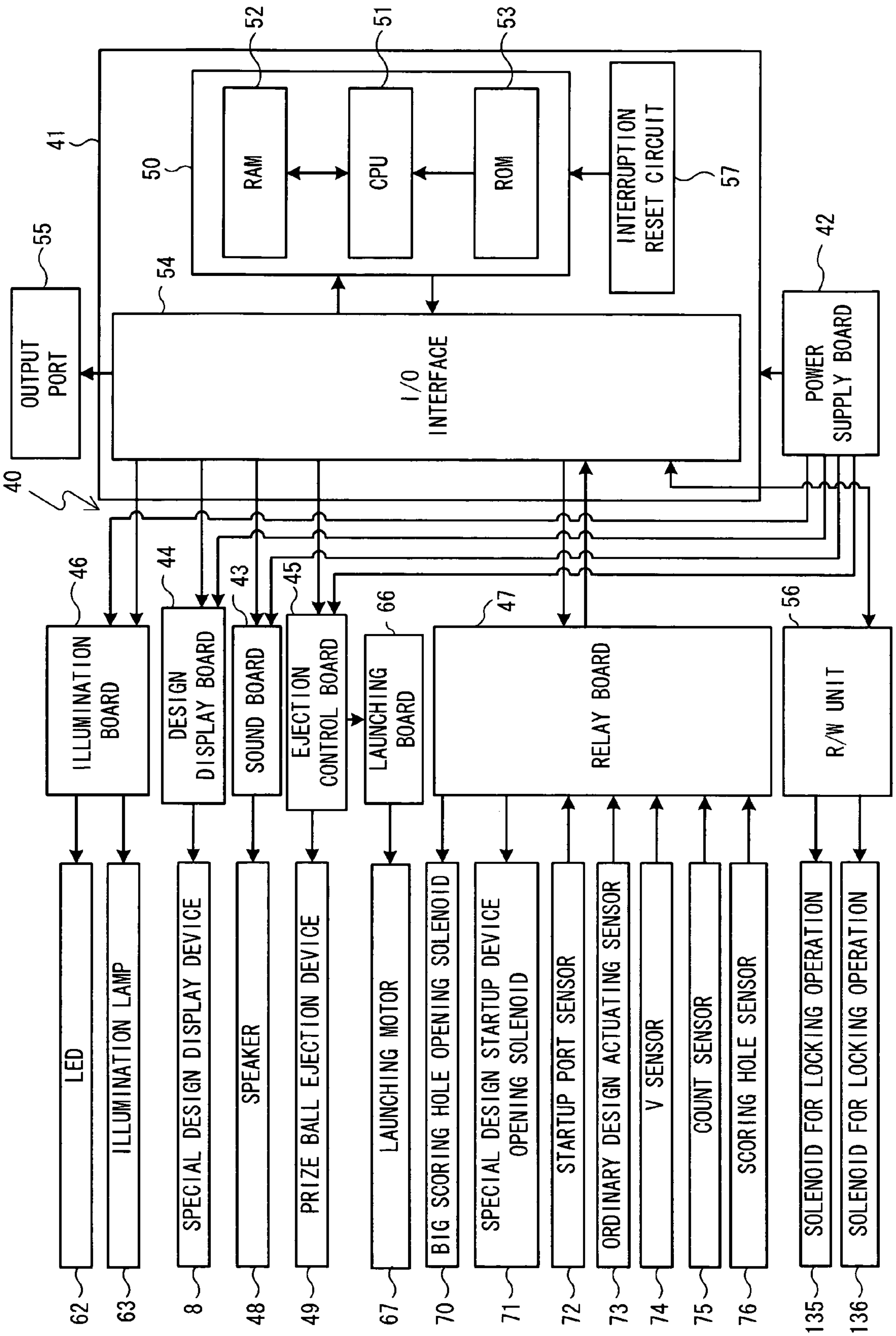
FIG. 12 is a block diagram showing an electric circuit structure of the pachinko game machine 1.

Next, an electric structure of the pachinko game machine 1 will be described with reference to FIG. 12. FIG. 12 is a block diagram showing an electric circuit structure of the pachinko game machine 1. The pachinko game machine 1 has its control section 40 at its backside. The control section 40 includes a main control board 41, a power supply board 42, a soundboard 43, a design display board 44, an ejection control board 45, an illumination board 46, a relay board 47, and a launching board 66. The main control board 41 includes an LSI 50 for performing various processings in accordance with a program. The LSI 50 includes a CPI 51 for performing various calculations, a RAM 52 for storing flags, counter values, data, programs and the like, and a ROM 53 for storing data of control programs and various kinds of initial values, and data of contents to be displayed on the special design display device 8. The CPU 51, the RAM 52, and the ROM 53 are integrally molded into one piece unit as a single LSI.

The main control board 41 also includes an I/O interface 54 for performing transmission and reception of data signals with the sound board 43, the design display board 44, the ejection control board 45, the illumination board 46, the relay board 47, and the like. The I/O interface 54 is connected with the R/W unit 56 so as to transmit and receive data signals to and from the main control board 41. The I/O interface 54 is also connected with an output port 55 for outputting various kinds of game information of the pachinko game machine 1 to the central management computer 300.

The soundboard 43, the design display board 44, the ejection control board 45, the illumination board 46, and the launching board 66 are also respectively provided with a CPU (not shown), a RAM (not shown), a ROM (not shown), and an I/O interface (not shown). The main control board 41 performs a main control to the pachinko game machine 1. The power supply board 42 converts an alternate current (24V), which has been supplied thereto from the game machine placement island, into a direct current, and supplies this direct current to the respective boards. The soundboard 43 controls generation of effect sounds of the pachinko game machine 1. The design display board 44 controls the special design display device 8. The ejection control board 45 controls the prize ball ejection device 49. The illumination board 46 controls illumination states of various illuminations of the pachinko game machine 1. The relay board 47 relays wirings between various sensors. The launching board 66 controls the launching motor 67 for launching game balls.

The illumination board 46 is connected with an LED 62 and an illumination lamp 63. The design display board 44 is connected with the special design display deice 8. The soundboard 43 is connected with a speaker 48. The ejection control board 45 is connected with the prize-ball ejecting device 49.

The relay board 47 is connected with a big scoring hole opening solenoid 70 for opening the opening-closing door of the big scoring hole 16, a special design startup device open solenoid 71, a startup port sensor 72 for detecting the game ball which has won the special design startup device 15, a normal design actuating sensor 73 for detecting game balls which have passed through the ordinary design startup gates 11, 12, a V sensor 74 for detecting the game ball which has entered the V zone in the big scoring hole 16, a count sensor 75 for counting the number of game balls which have entered the big scoring hole 16, and a win hole sensor 76 for detecting win balls which have entered into the ordinary scoring holes 19 or 20 and are collected to a win ball collecting section through an unillustrated guide passage. The R/W unit 56 is further connected with a solenoid for locking operation 135 which pushes or pulls the plunger 135*a*, and a solenoid for locking operation 136 which pushes or pulls the plunger 136*a*.

The power supply board 42 is connected with the main control board 41, the sound board 43, the design display board 44, the ejection control board 45, the illumination board 46, and the relay board 47 respectively, so that a stabilized electric power of direct current is supplied to these boards. The power supply board 42 is supplied with an alternate current of 24V. The power supply board 42 includes a rectifier made of an unillustrated silicon diode bridge, a smoothing circuit made of electrolysis capacitor, a stabilizing circuit made of a regulator IC, and the like. With this arrangement, the power supply board 42 can supply a stabilized direct current at 12V and 5V, and the like. Although not illustrated in FIG. 12, the main control board 41, the power supply board 42, the sound board 43, the design display board 44, the ejection control board 45, the illumination board 46, and the relay board 47 are all connected with each other through a ground line.

5. Description of the Structure of the Inventive Hardware

Figure 13:
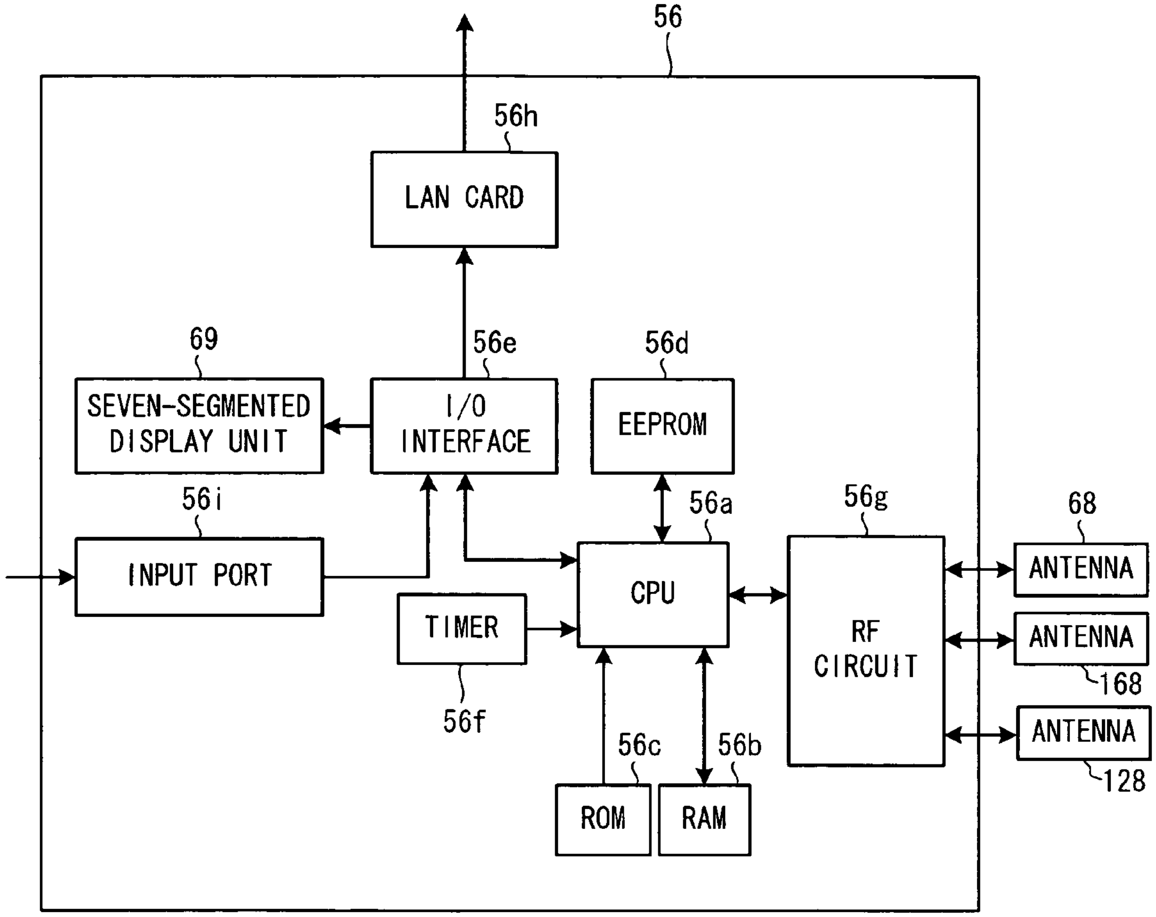
FIG. 13 is a block diagram showing an electric circuit structure of the R/W unit 56.

Next, an electric structure of the R/W unit 56 will be described with reference to FIG. 13. FIG. 13 is a block diagram showing an electric circuit diagram of the R/W unit 56. The R/W unit 56 includes a CPU 56*a* for performing various calculations, a RAM 56*b* for temporarily storing flags, data, and the like, a ROM 56*c* for storing control programs, data of various initial values, and the like, an EEPROM 56*d* for storing communication history with the IC tags for monitoring opening/closing operation 86, 186 and the IC tag for key 126, an I/O interface 56*e*, a timer 56*f*, an RF circuit 56*g* connected with the antennas for monitoring 68, 168 and the antenna for key 128 for releasing a calling wave to the IC tags for monitoring opening/closing operation 86, 186 and the IC tag for key 126 and receiving reflected waves from the IC tags for monitoring opening/closing operation 86, 186 and the IC tag for key 126, a LAN card 56*h* to be connected with a communication circuit 196 of the management machine 100, an input port 56*i* for receiving various signals from the main control board 41 of the pachinko game machine, and a seven-segmented display unit 69.

The CPU 56*a* transmits a calling wave from the RF circuit 56*g* to the IC tags for monitoring opening/closing operation 86 and/or 186 via the antennas for monitoring 68 and/or 168, and also to the IC tag for key 126 via the antenna for key 128. If there is a change in the presence or absence of the reflected waves from the IC tags 86 and/or 186 for monitoring opening/closing operation and the IC tag for key 126, the EEPROM 56*d* stores the ID codes of the IC tags and the time. In the case where the reflected wave has returned, the CPU 56*a* immediately transmits a next calling wave. Contrarily, in the case where no reflected wave has returned, the EEPROM 56*d* stores the time and the CPU 56*a* again transmits a next calling wave. In this manner, the R/W unit 56 almost always makes communication with the IC tags for monitoring opening/closing operation 86 and/or 186 and the IC tag for key 126 to check their states. The I/O interface 56*e* is connected with the communication circuit 106 (which will be described later) of the management machine 100 via the LAN card 56*h*. The I/O interface 56*e* transmits to the communication circuit 106 an ID code and monitoring history data of the time of disappearance, the time of recovery, and the like.

Figure 14:
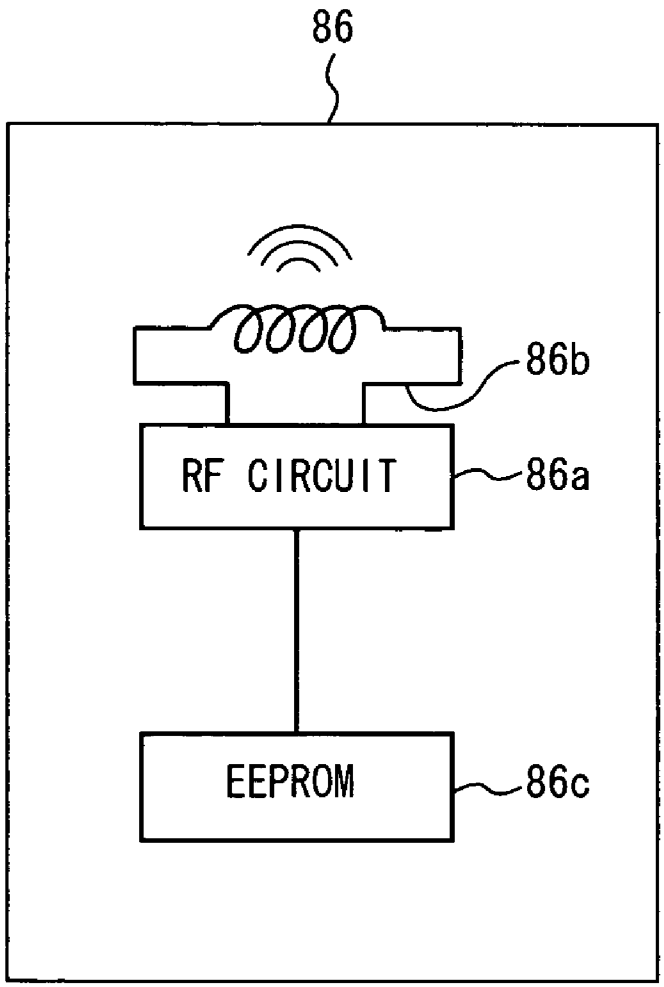
FIG. 14 is a block diagram showing an electric circuit structure of the IC tag 86.

Next, an electric structure of the IC tag for monitoring opening/closing operation 86 will be described with reference to FIG. 14. The IC tag for monitoring opening/closing operation 186 and the IC tag for key 126 also have identical electric structures. FIG. 14 is a block diagram showing an electric circuit structure of the IC tag for monitoring opening/closing operation 86. The IC tag for monitoring opening/closing operation 86 includes an RF circuit 86*a* for releasing a reflected wave in response to the calling wave from the R/W unit 56, a coil antenna 86*b*, and an EEPROM 86*c*. The EEPROM 86*c* stores an ID code for distinguishing the IC tag for monitoring opening/closing operation 86 from other IC tags and identification data of manufacturer ID, a hall ID, and the like in its over-writing and erase prohibited area. When a calling wave is sent from the R/W unit 56 via the antenna 68, the coil antenna 86*b* receives it. This calling wave contains a carrier wave. Thus-received calling wave is rectified by the RF circuit 86*a* so as to produce a direct current voltage. Therefore, the IC tag for monitoring opening/closing operation 86 is capable of transmitting data whenever necessary without using battery or external power supply. When data is to be transmitted, the identification data of ID code and the like is read from the EEPROM 86*c* and is put onto the reflected wave. Then, thus-produced data is transmitted from the RF circuit 86*a* toward the antenna 68. It is also possible that data of the time of disappearance or the time of recovery, which has been temporarily stored in the RAM 56*b* of the R/W unit 56 is received later and is stored in the EEPROM 86*c*.

Figure 15:
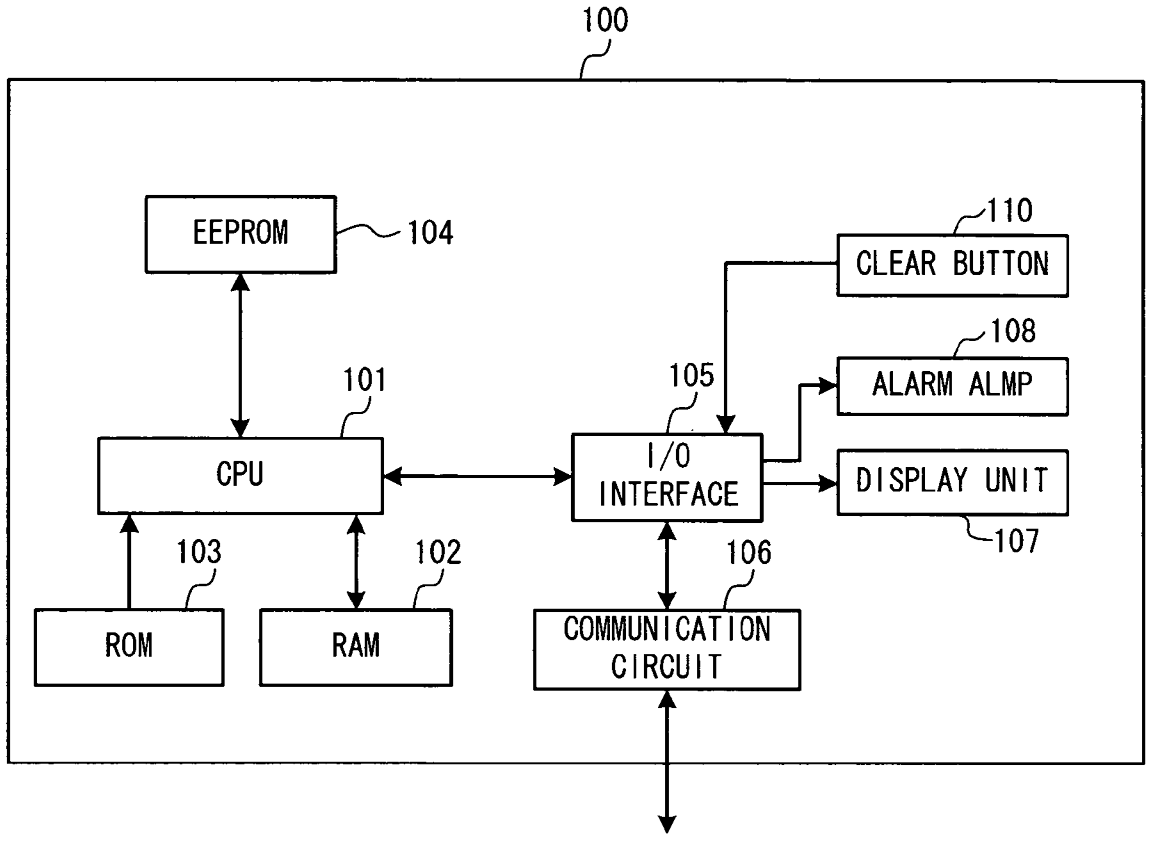
FIG. 15 is a block diagram showing the electric circuit structure of the management machine 100.

Next, an electric structure of the management machine 100 will be described with reference to FIG. 15. FIG. 15 is a block diagram showing an electric structure of the management machine 100. As shown in FIG. 15, the management machine 100 includes a CPU 101 for performing various calculations, a RAM 102 for temporarily storing flags, data, and the like, a ROM 103 for storing control program, data of various initial values, and the like, an EEPROM 104 for storing an administrative right database and a history database, an I/O interface 105 for performing transmission and reception of data with the R/W unit 56, a communication circuit 106, a display unit 107 for displaying the received monitoring history data, an alarm lamp 108 which is illuminated based on the received monitoring history data, and a clear button 110 for erasing the display on the display unit 107.

The ROM 103 stores a management program. The CPU 101 calls out the management program and executes management. The communication circuit 106 receives an ID code and monitoring history data of the time of disappearance, the time of recovery and the like from the I/O interface 56*e* of the R/W unit 56 via the LAN card 56*h* and through the communication cable 150 such as LAN cable. Based on the received monitoring history data, the display unit 107 makes a display and the alarm lamp 108 illuminates.

6. Description of the Operation of the Inventive Elements

Figure 16:
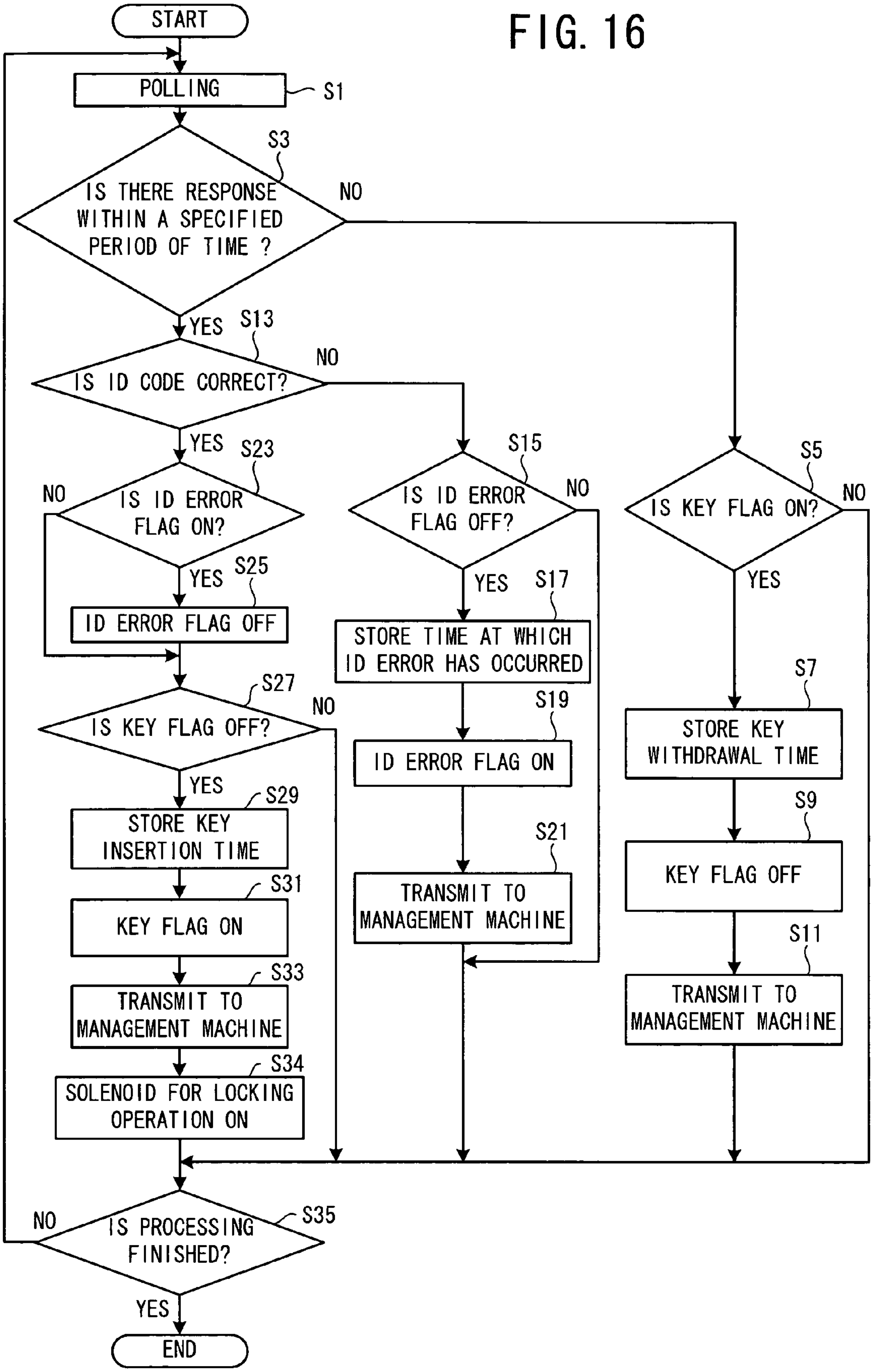
FIG. 16 is a flowchart of a monitoring processing of monitoring a state of the key 121.

Next, a processing for monitoring the key 121 performed in the R/W unit 56 will be described with reference to the flowchart of FIG. 16. FIG. 16 is a flowchart of a monitoring processing for monitoring the state of the key 121. In the processing for monitoring the key 121, it is monitored whether or not the key 121 has been inserted into the key hole 120 and whether or not the inserted key is an authorized key which has an ID code registered beforehand, and a history of key insertion is left as monitoring history data. If the key 121 is confirmed as being an authorized key, the plungers 135*a* and 136*a* are pulled for unlocking. The R/W unit 56 always performs the processing for monitoring the key 121, regardless of whether the amusement center is open or at night. In this embodiment, the R/W unit 56 receives electric power from the game machine placement island power supply, and the game machine placement island power supply remains powered even at night.

First, the CPU 56*a* in the R/W unit 56 transmits a calling wave to the IC tag for key 126 from the RF circuit 56*g* via the antenna for key 128 for polling (S1), and waits that the IC tag for key 126 returns the reflected wave with the ID code (identification data) carried thereon. When the key 121 is inserted and the key incorporates an IC tag therein, it should respond to the calling wave and return a reflected wave. Therefore, it is determined whether the reflected wave has been returned from the IC tag for key 126 within a specified period of time (S3). In this embodiment, the length of waiting time is set to 50 milliseconds.

If the reflected wave is returned from the IC tag for key 126 within the specified period of time (S3: YES), it can be determined that the key 121 incorporating the IC tag therein has been inserted into the key hole 120. Next, it is determined whether or not the key has a registered and true ID code (S13). If the ID code is correct (S13: YES), it is determined whether the ID error flag is ON (S23). The ID error flag is used for checking whether or not a correct ID is returned continuously from the previous time. If the ID error flag is ON (S23: YES), this means that the ID code has returned to correct one this time, and therefore, the ID error flag is turned OFF (S25). If the ID error flag is OFF (S23: NO), or when the step of S25 has finished, it is next determined whether or not the key flag is OFF in order to confirm that the key 121 has been inserted at this polling or is kept in an inserted state since earlier (S27). The key flag is set to ON if the IC tag for key 126 responds, whereas the key flag is set to OFF if the IC tag for key 126 does not respond. If the key flag is ON (S27: NO), this means that an ID code has been returned from the IC tag for key 126 within the specified period of time also at a previous time. Therefore, this is not the first time that the key 121 is inserted, and the key is already in an inserted state since earlier and has been in an unlocked state. As a result, nothing is stored and no data is transmitted to the management machine 100. Then, the process directly proceeds to S35.

If the key flag is OFF (S27: YES), this means that the IC tag which has not responded previous time has responded this time. In this case, it is determined that the key 121 has been inserted and the time at which the response of this time has been made is stored as the key insertion time into the EEPROM 56*d* together with the ID code (S29). Then, the key flag is turned ON (S31), and a code for identifying the pachinko game machine 1 is added top the ID code and the key insertion time, and the resultant code is transmitted to the management machine 100 via the communication cable 150 such as LAN cable and the like (S33). As a result, the management machine 100 can learn into which pachinko game machine the key has been inserted. Subsequently, a current is allowed to flow through the solenoids 135 or 136 for locking operation to turn on the solenoids (S34). When the solenoids 135 or 136 for locking operation are turned ON, the plunger 135*a* or 136*a* withdraws. Then, the key 121 is turned in a left or right direction so as to allow the stopper members 131 or 133 to move downward for unlocking, so that the glass frame 111 or main body frame 110 can be opened. Next, it is determined whether or not the key monitoring processing is finished (S35). If finished (S35: YES), the processing is end. If still not finished (S35: NO), the process returns to S1 and the processing is continued.

If the IC tag for key 126 has responded within a specified period of time (S3: YES), this proves that the key 121 incorporating the IC tag therein is inserted into the keyhole 120. However, the returned ID code is not correct (S13: NO), there is a possibility that an unauthorized key including an IC tag 86 replaced with an unauthorized one is used. At this point of time, the key 121 is determined as being in an abnormal state. Next, as is the case where no response has been obtained, it is determined whether or not this abnormal state has been continued. Specifically, it is determined whether or not the ID error flag is OFF (S15). The ID error flag is set to ON as far as the ID code is not correct. If the ID error flag is set to ON instead of OFF (S15: NO), this is the case where the ID code has not been correct continuously from the previous time. Therefore, no subsequent processing is performed any more and the process proceeds to S35.

If the ID error flag is OFF (S15: YES), this means that this is the first time that the ID code is not correct. In this case, the polling time is stored in the EEPROM 56*d* as the time at which the unauthorized key has been inserted (S17). Then, the ID error flag is turned ON (S19). After that, a code for identifying the pachinko game machine 1 is added to the ID code and the unauthorized key insertion time, and the resultant code is transmitted from the I/O interface 56*e* and the LAN card 56*h* to the management machine 100 via the communication cable 150 such as a LAN cable (S21). Then, the process proceeds to S35.

If a response is not returned within the specified period of time (S3: NO), it is imagined that the IC tag for key 126 is apart from the antenna for key 128 beyond a communication available range, except that the machine is out of order. Therefore, the key 121 can be determined as being in a non-inserted state into the keyhole 120. Next, it is determined whether or not the key has been withdrawn just now or is kept in a non-inserted state since earlier. If the key 121 is kept in a non-inserted state since earlier, the key withdrawing time is already stored and the data is already transmitted to the management machine at the point of time when the key has been withdrawn as will be described later. Therefore, it is needed to neither store nor transmit data on top of the data of the case where there is no change in the state. This arrangement saves storage capacity. Specifically, it is determined whether or not the key flag stored in the EEPROM 56*d* is ON (S5). The key flag is set to OFF as far as no response is returned from the IC tag, and is set to ON as far as a response is returned from the IC tag. If the key flag is OFF instead of ON (S5: NO), this is a case where no response has been returned continuously from the previous calling. Therefore, no subsequent processing is performed anymore and the process proceeds to S35.

If the key flag is ON (S5: YES), this means that this is the first time that no response is returned. In this case, it is determined that the key has been withdrawn, and the time at which polling has been made on the IC tag is stored in the EEPROM 56*d* as the key withdrawn time (S7). Then, the key flag is turned OFF (S9). Next, a code for identifying the pachinko game machine 1 is added to the ID code and the key withdrawn time, and the resultant code is transmitted from the I/O interface 56*e* and the LAN card 56*h* to the management machine 100 via the communication cable 150 such as a LAN cable (S11). Then, the process proceeds to S35. In this manner as described above, a history is stored by means of the time and the ID code at the point of time when the key has been inserted and withdrawn and data is transmitted to the management machine 100. If an ID code of the IC tag for key 126 incorporated in the key 121 is prepared for each key, a record about which key has been used for unlocking which pachinko game machine 1 is kept, and this record will be useful to discover a deceit action by an unfair use of the key.

Figure 17:
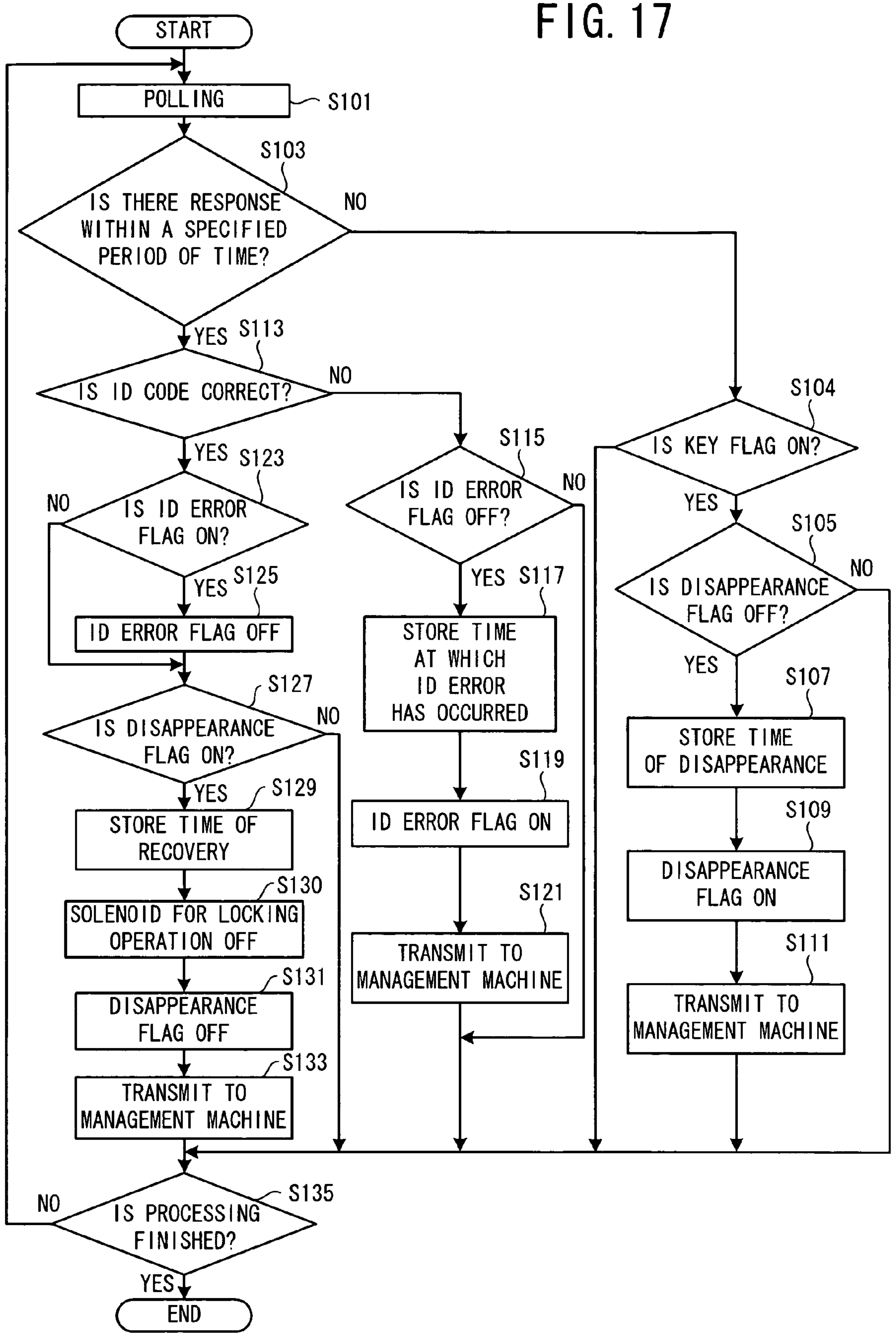
FIG. 17 is a flowchart of a monitoring processing of monitoring opened and closed states of the glass frame 111/main body frame 110.

Next, a monitoring processing for monitoring the opened and closed states of the glass frame 111 and main body frame 110 performed in the R/W unit 56 will be described with reference to the flowchart of FIG. 17. FIG. 17 is a flowchart of the monitoring processing for monitoring the opened and closed states of the glass frame 111 and main body frame 110. Although the processing is individually performed for each of the glass frame 111 and main body frame 110, the same processing is performed.

First, the CPU 56*a* in the R/W unit 56 transmits a calling wave from the RF circuit 56*g* to the IC tags 86 and/or 186 for monitoring opening/closing operation via the antennas for monitoring opening/closing operation 68 and/or 168 for polling (S101), and waits that the IC tags for monitoring opening/closing operation 86, 186 respectively return an ID code (identification data). Next, it is determined whether or not a reflected wave has been returned from the respective IC tags for monitoring opening/closing 86 and/or 186 operation within a specified period of time (S103). In this embodiment, the wait time is set to 50 milliseconds.

If a true ID code is returned from the respective IC tags for monitoring opening/closing operation 86 and/or 186 within the specified period of time and the response is continued from the previous time, it can be determined that the glass frame 111/main body frame 110 is not opened. In this determination, specifically, the following processings are preformed. If a response has been returned within the specified period of time (S103: YES), it is determined whether or not the returned ID code is correct (S113). If the ID code is correct (S113: YES), it is determined whether or not an ID error flag is ON (S123). The ID error flag is used for determining whether or not a correct ID has been returned continuously from the previous time. If the ID error flag is ON (S123: YES), this means that the ID code has returned to a correct one this time, and therefore, the ID error flag is turned OFF (S125). If the ID error flag is OFF (S123: NO) or after the step of S125 is finished, it is determined whether or not the disappearance flag is ON (S127). The disappearance flag is used for checking whether or not a response has been returned from the respective IC tags for monitoring opening/closing operation 86 and/or 186 within the period of time set at the previous time. If the disappearance flag is OFF (S127: NO), this means that the ID code has been returned from the respective IC tags for monitoring opening/closing operation 86 and/or 186 also at the previous time within the specified period of time. Since a correct ID code has been returned within the specified period of time continuously from the previous time, it is determined that the glass frame 111/main body frame 110 is not opened. In this case neither storage nor data transmission to the management machine 100 is performed, and the process directly proceeds to S135.

If a response is not returned within the specified period of time (S103: NO), it is imagined that the glass frame 111/main body frame 110 to which the IC tags for monitoring opening/closing operation 86 and/or 186 are attached respectively has been opened, except that the machine is out of order. Then, it is checked whether or not the authorized key 121 is inserted in the key monitoring processing by checking whether or not the key flag is ON (S104). If the key flag is ON (S104: YES), this means that the glass frame 111/main body frame 110 has normally been opened as a result that the frame has been unlocked by inserting the authorized key 121 therein, and the process directly proceeds to S135. If the key flag is OFF (S104: NO), it is imagined that the glass frame 111/main body frame 110 has been opened as a result that the frame has been unlocked by inserting an unauthorized key therein or has been forcedly opened using a wire and the like. At this point of time, the glass frame 111/main body frame 110 is determined as having been opened abnormally. Next, it is determined whether or not this abnormal opened state is continued. If this abnormal state is continued, the time at which the frame has been opened (time of disappearance) is already stored and the abnormal data is already transmitted to the management machine as will be described later. Therefore, it is needed to neither store nor transmit data on top of the data of the case where there is no change in the state. This arrangement saves storage capacity. Specifically, it is determined whether or not the disappearance flag stored in the EEPROM 56*d* is OFF (S105). The disappearance flag is set to ON as far as no response is returned from the IC tag, and is set to OFF as far as a response is returned from the IC tag. If the disappearance flag is OFF instead of ON (S105: NO), this is a case where no response has been returned continuously from the previous calling. Therefore, no subsequent processing is performed any more and the process proceeds to S135.

If the disappearance flag is OFF (S105: YES), this means that this is the first time that no response is returned. In this case, it is determined that the glass frame 111/main body frame 110 has been opened just now and the time at which polling has been made on the IC tag is stored in the EEPROM 56*d* as the time of disappearance (time at which the frame has been opened) (S107). Then, the disappearance flag is turned ON (S109). Next, an ID code is combined with the time of disappearance and is transmitted to the management machine 100 via the communication cable 150 such as a LAN cable (S111). Then, the process proceeds to S135. In this manner as described above, a history is stored at the point of time when an abnormality has occurred and data is transmitted to the management machine 100, and the management machine 100 makes an annunciation.

If a response has been returned within the specified period of time (S103: YES) but the returned ID code is incorrect (S113: NO), there is a possibility that a deceit action of replacement of the IC tags for monitoring opening/closing operation 86 and/or 186 has been made. At this point of time, the glass frame 111/main body frame 110 is determined as having an abnormality. Then, it is determined, as is performed in the case where no response is obtained, whether or not this abnormal state is continuous. Specifically, it is determined whether or not the ID error flag is OFF (S115). The ID error flag is set to ON as far as the ID code is not correct. If the ID error flag is ON instead of OFF (S115: NO), this is the case where the ID code is not correct continuously from the previous time. No subsequent processing is performed any more and the process proceeds to S135.

If the ID error flag is OFF (S115: YES), this means that this is the first time that the ID code is not correct. In this case, the polling time is stored in the EEPROM 56*d* as the time when the ID error has occurred (S117). Then, the ID error flag is turned ON (S119). Subsequently, the ID code is combined with the ID error occurrence time and is transmitted from the I/O interface 56*e* to the management machine 100 via the communication cable 150 such as a LAN cable (S121). Then, the process proceeds to S135.

If a response is returned within the specified period of time (S103: YES); the returned ID code is correct (S113: YES); and the disappearance flag is ON (S127: YES), this means that the IC tag which did not return a response at a previous time has returned a response at this time, that is, the opened glass frame 111/main body frame 110 has been closed. In this case, the time at which the response has been returned this time is stored in the EEPROM 56*d* as the time of recovery (time at which the frame has been closed) (S129). The EEPROM 56*d* completes to store the time of disappearance when the response stops. By also storing the time of recovery at this time, it becomes possible to calculate the period of time during which the glass frame 111/main body frame 110 has been opened. Closing the glass frame 111/main body frame 110 allows the projecting portions 131*a*, 132*a* to engage with the engagement portions 131*b* or 132*b*, and allows the projecting portions 133*a* or 134*a* with the engagement portions 133*b* or 134*b* so as to lock the frame. Further, the current flowing through the solenoids 135 or 136 for locking operation is shut down to turn off the solenoids (S130), and the plunger 135*a* or 136*a* is allowed to project so as to prevent the stopper members 131 or 133 from moving downward. With this arrangement, an unlocking operation using a key with incorrect ID is prevented by the plunger 135*a* or 136*a* as has been described with reference to the flowchart of FIG. 16. As a result, an unlocking operation can be prevented if an unauthorized key is inserted at the next time.

Then, the disappearance flag is turned OFF (S131). Subsequently, the ID code is combined with the time of recovery, and is transmitted to the management machine 100 via the communication cable 150 such as a LAN cable (S133). Then, it is determined whether or not the processing for monitoring opening/closing operation is finished (S135). If finished (S135: YES), the processing is end. If still not finished (S135: NO), the process returns to S101 and the processing is continued.

The processing is performed as described above, and if a true ID code is returned within the specified period of time continuously from the calling of the previous time, the frame is determined as being in a normal state and the process returns to a step in which the calling to the ID code is performed (S101). If no response is returned within the specified period of time and the opening action is not a normal one using a key, or if there is a response within the specified period of time but the response has a wrong ID code, the glass frame 111/main body frame 110 is determined as being in an abnormal state. In any case, it is checked whether or not the state is continued from the previous time, and the time is stored only when this is the first time that the state has changed. Even if a true ID code is returned within the specified period of time but no response has been returned although the opening action at the previous time was not a normal one by a key, it is determined that there is a change in the state even if the state is normal and the time is stored. Then, data is transmitted to the management machine 100 on top of the storage of the time. When the storage or data transmission is performed, the process returns to S101 immediately after a series of processings is finished and calls out the ID code again. In the manner as described above, the IC tag is always called out to check its state, and a necessary processing is performed based on the result of determination. With this arrangement, it is possible to check the abnormality in the glass frame 111/main body frame 110 and store the history of the change in the state by means of a minimum storage capacity, thereby performing monitor efficiently.

Further, in comparison between the processing for monitoring the key shown in FIG. 16 with the monitoring history in the processing for monitoring opening/closing operation shown in FIG. 17, it is possible to know as to each pachinko game machine 1, (1) by use of which key, (2) when, and (3) how long, the glass frame 111/main body frame 110 has been opened. If the period of time during which the use of each key is permitted is determined in accordance with the work time of the staff who carries the key, the opening action to the glass frame 111/main body frame 110 which has been performed out of the period of time during which the use of the key is permitted, it is highly probable that this opening action is a deceit action. In this case, the staffs in the amusement center can check the details of this opening action and take any proper measurements.

Figure 18:
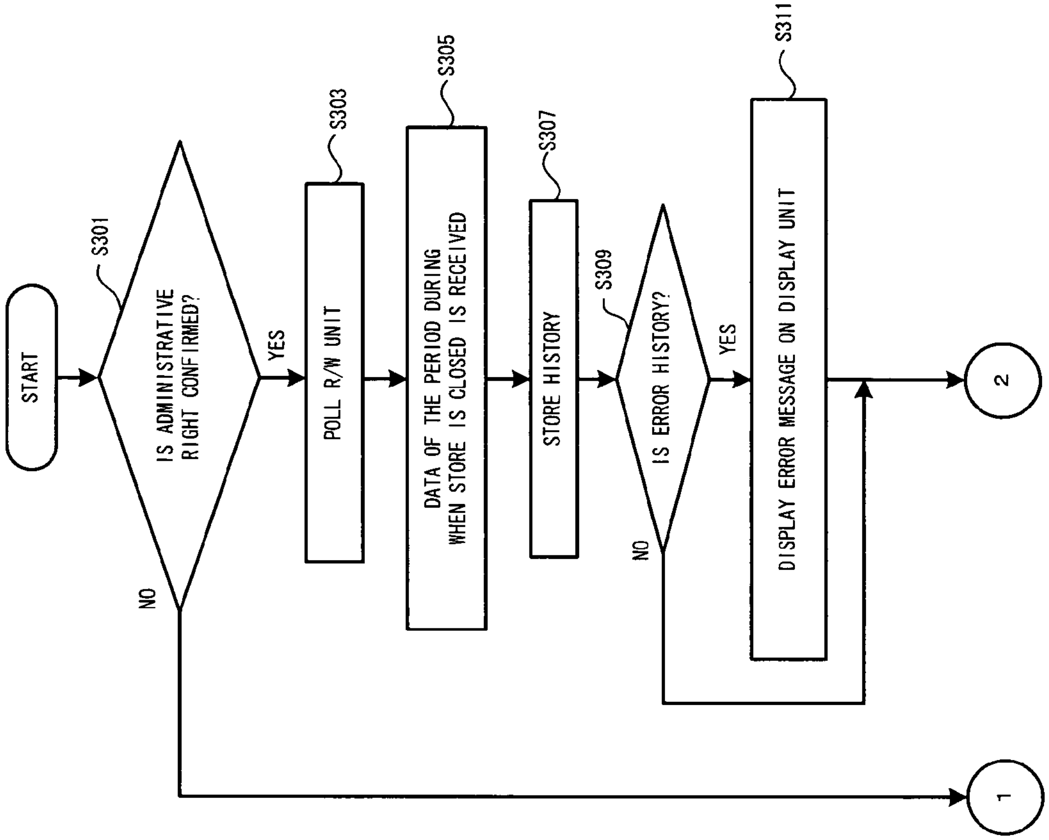
FIG. 18 is a first half of a flowchart showing a schematic processing performed in the management machine 100.
Figure 19:
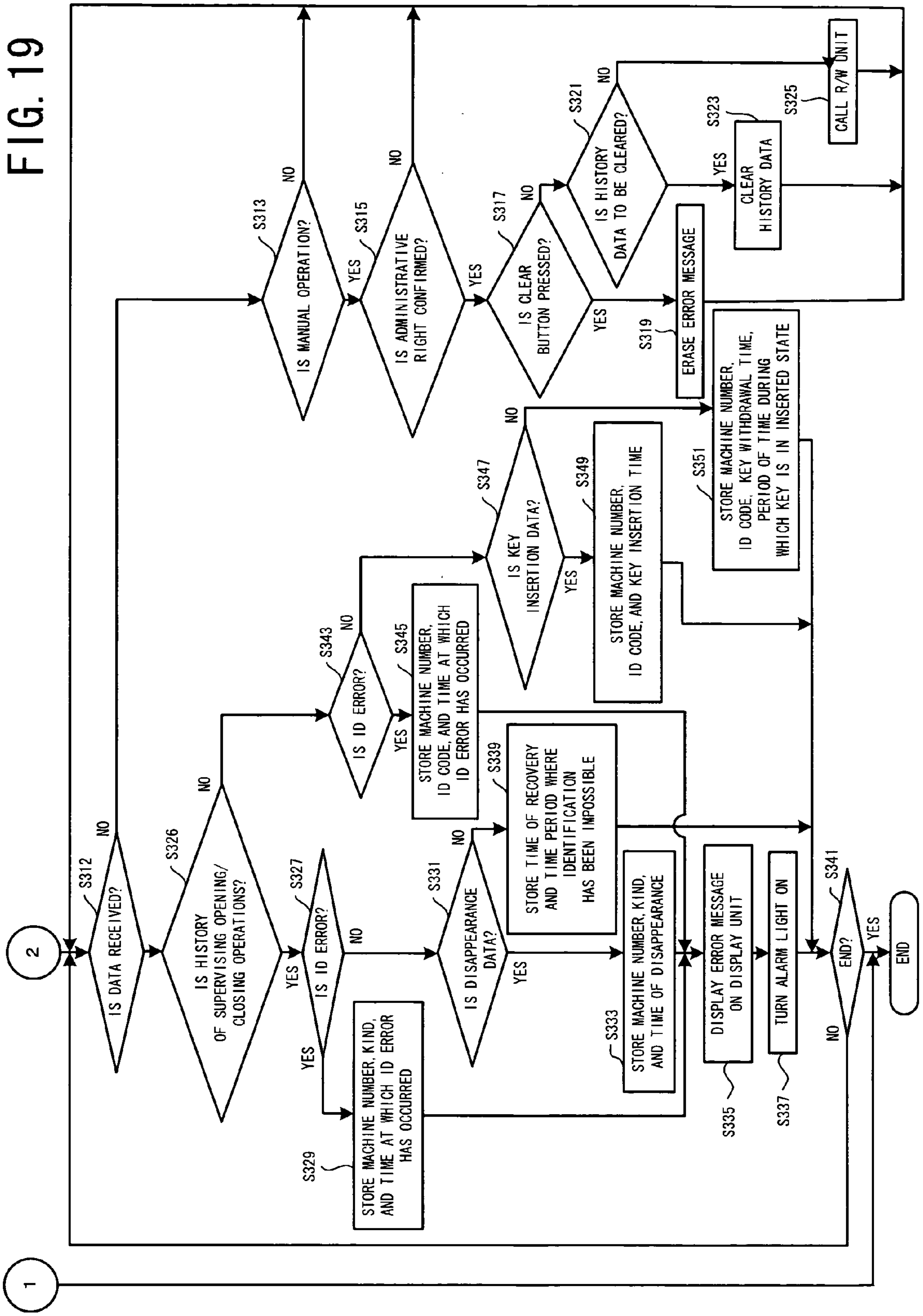
FIG. 19 is a latter half of a flow chart showing a schematic processing performed in the management machine 100.

Next, a processing performed in the management machine 100 will be described based on the flowchart of FIGS. 18 and 19, and the history database of FIG. 20. FIGS. 18 and 19 are flowcharts each schematically showing the processing performed in the management machine 100, and FIG. 20 is a schematic diagram showing a history database to be stored in the EEPROM 104 of the management machine 100.

When the amusement center is opened and the electric power of the management machine 100 is turned on, the processings in S301 to S311 of the opening of the amusement center are performed. First, an input by a staff is accepted and it is determined whether or not the administrative right such as a password, an ID card, and the like has been confirmed (S301). The administrative right is checked by the administrative right database stored in the EEPROM 104 of the management machine 100 and comparing the input password or the ID of the staff with the password or the ID stored in the database. If administrative right is not confirmed (S301: NO), the processing is finished. If administrative right is confirmed (S301: YES), polling is performed for the R/W unit 56 belonging to each pachinko game machine 1 via the LAN cable (S303). Then, a monitoring history during the time when the amusement center is closed is received (S305), and the history is stored in the history database of the EEPROM 104 (S307). If the received history contains an error history (S309: YES), the detail of the error is displayed on the display unit 107 (S311). If the received history contains no error history (S309: NO), nothing is displayed on the display unit 107. The stored history can be utilized for identifying the staff who has made the opening/closing actions in the case where other kinds of errors, such as an unfair supply of large amount of game balls, have been found.

After the processing of the opening of the amusement center is finished, the monitoring processing during which the amusement center is opened in S312 to S351 is repeated. First, it is determined whether or not data has been received from the R/W unit 56 belonging to the pachinko game machine 1 (S312). If data has been received (S312: YES), it is determined whether or not the data is history data of monitoring opening/closing operation by the IC tags for monitoring opening/closing operation 86 and/or 186 (S326). If the data is history data of monitoring opening/closing operation (S326: YES), it is determined whether or not the data is ID error data (S327). If the data is ID error data (S327: YES), the machine number of the pachinko game machine 1 and the location (kind) of the IC tag where the ID error has occurred are determined from the ID code. These information and the time when the ID error has occurred are stored in the history database of the EEPROM 104 (S329). As shown in FIG. 20, the history database stores about a week of ID codes, the machine numbers of the pachinko game machines 1, the locations of the IC tags (kinds), the times at which the key has been inserted, the times at which the key has been withdrawn, the periods of time during which the key has been in an inserted state from the key insertion time to the key withdrawal time, the times of disappearance, the times of recovery, the periods of time during which the identification is impossible from the time of disappearance to the time of recovery, and the times when the ID error has occurred. Then, as shown in FIG. 11, an error message is displayed on the display unit 107, such as "ID error has occurred in the main body frame of XXth pachinko game machine" (S335), and the corresponding alarm lamp is illuminated (S337). When the alarm lamp is illuminated and the error message is displayed on the display unit 107, a staff of the amusement center on patrol becomes aware of the states of the glass frame 111 or the main body frame 110, and goes to the pachinko game machine 1 in question to check its state.

If the received data is not ID error data of the history of monitoring opening/closing operation (S327: NO), it is determined whether or not the received data is disappearance data which is a combination of the ID code with the time of disappearance (S331). If the received data is disappearance data (S331: YES), the machine number of the pachinko game machine 1 and the location (kind) where the disappeared IC tag has been placed are determined from the ID code, and the information and the time of disappearance are stored in the history database of the EEPROM 104 (S333). Then, an error message is displayed on the display unit 107, such as "the main body frame of XXth pachinko game machine has been unfairly opened" as shown in FIG. 11 (S335), and the corresponding alarm lamp is illuminated (S337). Then, the process proceeds to S341.

If the received data is not disappearance data (S331: NO), it is recovery data obtained from the IC tag which has been temporarily in a communication unavailable state and then returned to a communication available state. The sent ID code is searched on the history database, and the time of recovery is stored in the corresponding record (S339). Further, the period of time where the identification has been impossible from the time of disappearance to the time of recovery is calculated and stored. Then, the process proceeds to S341.

If the received data is not history data of monitoring opening/closing operation (S326: NO), this is history data of monitoring key obtained as a result of monitoring the key 121. First, it is determined whether or not the data is ID error data (S343). If the data is ID error data (S343: YES), the ID code and the time when the ID error has occurred are stored in the history database of the EEPROM 104 (S345). Then, the error message is displayed on the display unit 107, such as "an unauthorized key insertion has been made in XXth pachinko game machine" (S335), and the corresponding alarm lamp is illuminated (S337). When the alarm lamp is illuminated and the error message is displayed on the display unit 107, a staff of the amusement center on patrol becomes aware that an unauthorized key has been used. Then, the process proceeds to S341.

If the data is not ID error data (S343: NO), it is determined whether the data is key insertion data which is history data obtained when an authorized key has been inserted (S347). If the data is key insertion data (S347: YES), the ID code, the machine number of the pachinko game machine 1, and the time at which the key has been inserted are stored (S349). Then, the process proceeds to S341. If the data is not key insertion data (S347: NO), this is key withdrawal data obtained when the key has been withdrawn. In this case, the ID code and the time at which the key has been withdrawn are stored. At the same time, if the time at which the key has been inserted or the time at which an unauthorized key has been inserted are stored for one and the same ID code, the difference between such time and the key withdrawal time is calculated so as to obtain the period of time during which the key has been in an inserted state, and the resultant period of time is stored (S351).

When the processing in S337, S345, S349, and S351 are finished, it is determined whether or not the processing in the management machine 100 should be finished (S341). If the processing should be finished (S341: YES), the entire processing is finished. If the processing should not be finished (S341: NO), the process returns to S312 and the reception of data is waited.

If no data has been received from the R/W unit 56 (S312: NO), it is determined whether or not a manual operation by a staff of the amusement center and the like has been made (S313). If no manual operation has been made (S313: NO), the process returns to S312. If a manual operation has been made (S313: YES), it is determined whether or not the administrative right has been confirmed (S315). If no administrative right is confirmed (S315: NO), the process returns to S312. If administrative right is confirmed (S315: YES), it is determined whether or not the clear button 110 for erasing the display on the display unit 107 has been pressed (S317). If the display is to be erased (S317: YES), the error message displayed on the display unit 107 is erased (S319). As shown in FIG. 11, the display unit 107 of the management machine 100 displays the machine number of the pachinko game machine 1, and also displays that, when a frame was opened, the frame was either the glass frame 111 or the main body frame 110 and that, when the frame was opened using an unauthorized key, the unauthorized key was used. At the same time, the alarm lamp 108*b* is illuminated in the case of the glass frame 111 and the alarm lamp 108*a* is illuminated in the case of the main body frame 110. When a staff of the amusement center and the like is notified of such an annunciation and responds to the abnormality in the amusement center, the display thereafter is not needed any more, and the display is erased by a manual operation.

If the display is not to be erased (S317: NO), it is determined whether or not the current processing is a process of clearing the history data (S321). The monitoring history data stored in the IC tags for monitoring opening/closing operation or R/W unit 56 is cleared when a clear command is received after a predetermined period of time has elapsed, so that new monitoring history data can be stored. After the monitoring history data is transmitted to the central management computer 300, it is not needed to store the history in the IC tags for monitoring opening/closing operation, the R/W unit 56, and the management machine 100 anymore. By periodically clearing history data, the IC tags, the R/W unit and the management machine can be structured using a small storage capacity. If the processing is clearing of the monitoring history data (S321: YES), the monitoring history data stored in the IC tags for monitoring opening/closing operation, the R/W unit 56, and/or the EEPROM 104 of the management machine 100 is erased (S323). If the processing is not clearing of history data (S321: NO), polling is performed to the R/W unit 56 (S325) and the reception of data is waited (S312). The R/W unit 56 is called out by manipulating the keyboard of the management machine 100. In the manner as described above, a staff of the amusement center and the like can check the states of the glass frame 111/main body frame 110 to be monitored whenever necessary.

7. Effects of the Embodiment

As described above, according to the management system of this embodiment, the IC tags for monitoring opening/closing operation are provided to the glass frame 111/main body frame 110 of the pachinko game machine 1 connected to the management machine 100. A calling wave is almost always transmitted from the R/W unit 56 to the respective IC tags for monitoring opening/closing operation and the IC tags are allowed to return reflected waves including the identification data of the IC tags for monitoring opening/closing operation. If any IC tag returns no response (responses have disappeared) or starts to respond again (responses have recovered), the ID code, the time of disappearance and the time of recovery of the IC tag for monitoring opening/closing operation are transmitted to the management machine 100. In addition, the IC tag for key 126 is incorporated in the key 121. The solenoid for locking operation is turned on for unlocking by pulling a plunger only when an authorized ID code is returned. The time of key insertion and the time of key withdrawal are stored for the ID code specific to the key, and these times are transmitted to the management machine 100 together with the identification code of the pachinko game machine 1. In this manner, the use history of the key can be controlled and deceit actions by an unfair use of the key or duplication of the key can be discovered or prevented. When receiving such data transmission, the management machine 100 stores the details of the received data and allows the display unit 107 to display the details, so as to alert a staff and the like to the abnormality. In this manner, the management system serves to find deceit actions at an early stage or to prevent deceit actions.

8. Description of the Exemplified Modifications

The present invention is not limited to the embodiment described above, and various modifications maybe made. Hereinafter, exemplified modifications of this embodiment to which the present invention is applied are described. First, in the embodiment of the present invention, the R/W unit 56 is connected with the management machine 100 using the wired communication cable 150. Alternatively, the same structure is also available by employing wireless connection using an infrared communication or wireless communication and the like. In addition, in the embodiment described above, a single management machine 1 is provided to each island where the game machines are placed. Alternatively, a single management machine 1 may be provided to a plurality of islands together, or the central management computer 300 which manages the overall amusement center may be structured in such a manner that it serves also as the management machine. The same effect as of the embodiment described above may be realized by employing a structure in which various kinds of game information of the pachinko game machine 1 are directly transmitted to the central management computer 300 without passing through the R/W unit 56 or the management machine 100.

The location of the R/W unit 56 is not limited to the outside of the center covering 90. The R/W unit 56 may be mounted to other locations in the pachinko game machine 1 or may be mounted to the game machine placement island. Further, it is possible to employ a structure in which, instead of preparing one R/W unit 56 for the pachinko game machine 1, one or a plurality of R/W units 56 are provided to the island for monitoring IC tags provided to a plurality of pachinko game machines 1. Further, it is possible to employ a structure in which the R/W unit 56 is supplied with electric power from the pachinko game machine 1 side, for example, from the main control board 41 or the power supply board 42 having a backup power supply, instead of being supplied with electric power from the game machine placement island. In the case of employing a structure in which the R/W unit 56 is supplied with electric power from the main control board 41 of the pachinko game machine 1, after the amusement center is closed, the monitoring processing can be continued using electric power supplied from the backup power supply of the pachinko game machine 1. In addition, it is also possible to employ a structure in which the R/W unit 56 includes a backup power supply therein. This backup power supply is charged during which the amusement center is open, and after the amusement center is closed, the R/W unit 56 operates using the backup power supply.

The IC tags for monitoring opening/closing operation and the IC tag for key are not limited to a thin and small rectangle shape or a stick shape as in the embodiment described above. Alternatively, the IC tags may be freely structured in its shape and size, and may be in a coin shape and the like. Further, the IC tags are not limited to an electromagnetic induction system as in the embodiment described above. Alternatively, the IC tags may be in any other various systems such as electromagnetic coupling system, microwave system, light system, and the like. In addition, the attachment positions of the IC tags for monitoring opening/closing operation and the antenna for monitoring are not limited to the positions described in the foregoing embodiment, but the IC tags and the antenna may be attached to any positions as far as they are located on the surfaces opposed to the main body frame 110, glass frame 111, and wooden frame 112. The communication available distance between the IC tags for monitoring opening/closing operation and the antenna for monitoring is not limited to about 5 mm as in the foregoing embodiment, but is adjustable according to the necessity by changing the locations of the IC tags where the IC tags perform monitoring.

In the monitoring processing in the foregoing embodiment, the length of waiting time that the reflected wave is returned from the IC tag is set to 50 milliseconds. However, the length of waiting time is not limited to 50 milliseconds, but is variable within the range of several milliseconds and several seconds as far as the monitoring can be performed in real time. Instead of storing the time at which the key has been inserted, the time at which the key has been withdrawn, the time at which the error has occurred, the time of disappearance and the time of recovery are stored in the EEPROM **56*d* of the R/W unit 56, a hard disc may be provided within the R/W unit 56 and these times are stored therein, or other storage medium such as optical medium may be employed for storing these times. Alternatively, these times may be temporarily stored in the RAM 56*b*, and data may be transmitted to the management machine, and then the RAM 56*b* is cleared. When this structure is employed, the EEPROM 56*d* is not necessary. In addition, a structure may be employed in which, if no response is returned from the IC tags for monitoring opening/closing operation, the polling time is temporarily stored in the RAM 56*b* of the R/W unit 56 as the time of disappearance. Then, the polling time is stored in the EEPROM 86*c* of the IC tags for monitoring opening/closing operation 86 and/or 186 together with the time of recovery in the case of recovery. When this structure is employed, the history is held in both the EEPROM 86*c* and the management machine. Therefore, in case that the data in the management machine has disappeared, the history remains. If the IC tag for monitoring opening/closing operation is returned to the manufacturer of the pachinko game machine 1, the history is also managed by the manufacturer. Further, a power supply may be provided within the IC tag 86, so that the history is stored in the EEPROM 86*c* at the same time that it is stored in the EEPROM 56*d*. Alternatively, the history may be stored in the EEPROM 86*c* instead of the EEPROM 56*d*. Still alternatively, the results may be only transmitted to the management machine 100 without being stored in the RAM and EEPROM 86*c* during which the amusement center is open, but may be stored only during which the amusement center is closed. In addition, although the details of received data are stored to allow the display unit to only display and the alarm lamp to illuminate in the processing performed in the management machine 100, the stored details may be transmitted to the central management computer 300 and may be stored therein for about one month, or transmitted to the external storage device. In addition, the length of time that the identification is impossible may be calculated in the R/W unit 56 instead of the management machine 100, and may be transmitted from the R/W unit 56 to the management machine 100** together with the recovery data.

The solenoid for locking operation is turned on for unlocking when the key having an authorized ID code is inserted in the processing of monitoring the key. Further, the period of time during which the use of the key is permitted may be determined. Thus-determined period of time is stored in the R/W unit 56 beforehand and an unlocking operation is not permitted out of the key use permitted period of time. In this case, if a step of determining whether or not now is the time falling within the key use permitted period of time by comparing the polling time with the key use permitted period of time is added before the step of S34 in FIG. 16. In this structure, it is possible to prevent deceit actions from being made during which the amusement center is in a closed state at night and the like, such as opening the glass frame 111 or the main body frame 110 by unfairly using an unauthorized key and replacing a ROM into an unauthorized one.

INDUSTRIAL APPLICABILITY

As described above, the locking system of the present invention is suitable for monitoring the unlocked or locked states of devices such as game machines which may possibly be subjected to deceit actions in the state that the locking system is provided to such devices.

The invention claimed is:

1. A locking system for a game machine comprising:

an IC tag for locking operation;

an IC tag for monitoring opening/closing operation;

an IC tag monitoring device that communicates with the IC tag for locking operation and the IC tag for monitoring opening/closing operation; and a locking device that locks and unlocks a device based on a result of monitoring made by the IC tag monitoring device, wherein said IC tag for locking operation stores identification data that is used for distinguishing the IC tag for locking operation from other IC tags, wherein said IC tag for monitoring opening/closing operation stores identification data that is used for distinguishing the IC tag for monitoring opening/closing operation from other IC tags, wherein said IC tag monitoring device includes (1) a first transmission means for transmitting a calling wave for calling said IC tag for locking operation, (2) a first reception means for receiving a reflected wave returned from said IC tag for locking operation, (3) an antenna for key that is connected to said first transmission means and said first reception means, (4) key determination means for determining proper reception of the reflected wave containing identification data within a specified period of time since the transmission of the calling wave by the first transmission means and proper comparison of identification data of the reflected wave to data registered beforehand, (5) a first output means for outputting the result of key determination made by the key determination means and key monitoring history data to the outside, (6) a second transmission means for transmitting a calling wave for calling said IC tag for monitoring opening/closing operation, (7) a second reception means for receiving a reflected wave returned from said IC tag for monitoring opening/closing operation, (8) an antenna for monitoring connected to said second transmission means and said second reception means, (9) an opening/closing operation determination means for determining proper reception by the second reception means, of the reflected wave, through comparison of the identification data of the reflected wave to data registered beforehand, and

(10) a second output means for outputting history data of monitoring opening/closing operation containing result of opening/closing operation determination by the opening/closing operation determination means to the outside, wherein said key monitoring history data comprises at least one of a key insertion time, a key withdrawal time, and a key ID abnormal time, and wherein said locking device comprises a key including said IC tag for locking operation and a lock that includes said antenna for key and into which said key is to be inserted.

2. A locking system according to claim 1, wherein said locking device comprises third reception means for receiving said result of key determination outputted from said first output means, and unlocking means for unlocking operation if said result of key determination received by said second reception means is normal.

3. A locking system according to claim 1, wherein said key monitoring history data comprising at least one of the key insertion time that is the time at which the communication unavailable state in which said first reception means cannot receive said reflected wave has changed into the communication available state in which said first reception means is configured to receive said reflected wave and identification data contained in the received reflected wave, the key withdrawal time that is the time at which said communication available state has changed into said communication unavailable state, and the key ID abnormal time that is the time at which identification data different from the registered data that is registered beforehand is received and identification data contained in the received reflected wave.

4. A locking system according to claim 1, wherein said IC tag monitoring device comprises annunciation means for making an annunciation if both of said result of key determination and said result of opening/closing operation determination are abnormal.

5. A locking system according to claim 1, wherein said antenna for monitoring is provided to a device main body in the vicinity of said IC tag for monitoring opening/closing operation if said IC tag is provided to said opening/closing member, and is provided to said opening/closing member in the vicinity of the IC tag for monitoring opening/closing operation if said IC tag is provided to said device main body, wherein said antenna for monitoring and said IC tag for monitoring opening/closing operation is configured to make communication with each other if said opening/closing member is in a closed state, and cannot make communication with each other if said opening/closing member is in an opened state.

6. A locking system according to claim 1, wherein said history data of monitoring opening/closing operation comprises at least one of the time of disappearance that is the point of time at which the communication available state in which said second reception means is configured to receive said reflected wave has changed into the communication unavailable state in which said second reception means cannot receive said reflected wave, the time of recovery that is the point of time at which said communication unavailable state has changed into said communication available state, and the time of ID abnormality that is the point of time at which identification data different from the registered data that has been registered beforehand has received.

7. A game machine comprising the locking system according to claim 1.

8. A device management system in which a device that includes the locking system according to claim 1 is connected with a management machine that manages the device via a network, wherein said management machine comprises monitoring history data reception means for receiving said result of key determination that is outputted from said first output means or said key monitoring history data, or for receiving said history data of monitoring opening/closing operation outputted from said second output means.

9. A device management system according to claim 8, wherein said management machine comprises monitoring history data storage means for storing said result of key determination or said key monitoring history data that said monitoring history data reception means has received or for storing said history data of monitoring opening/closing operation.

10. A device management system according to claim 8, wherein said management machine comprises monitoring history data output means for outputting said result of key determination or said key monitoring history data that said monitoring history data reception means has received or for outputting said history data of monitoring opening/closing operation.

* * * * *